United States Patent
Kuriyama et al.

(10) Patent No.: US 10,773,497 B2
(45) Date of Patent: Sep. 15, 2020

(54) DECORATIVE SHEET AND DECORATIVE RESIN MOLDED ARTICLE

(71) Applicant: DAI NIPPON PRINTING CO., LTD., Tokyo (JP)

(72) Inventors: Chigusa Kuriyama, Tokyo (JP); Toshifumi Fujii, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 14/780,871

(22) PCT Filed: Mar. 25, 2014

(86) PCT No.: PCT/JP2014/058333
§ 371 (c)(1),
(2) Date: Sep. 28, 2015

(87) PCT Pub. No.: WO2014/157232
PCT Pub. Date: Oct. 2, 2014

(65) Prior Publication Data
US 2016/0052244 A1    Feb. 25, 2016

(30) Foreign Application Priority Data

Mar. 29, 2013  (JP) .................. 2013-073144
Mar. 29, 2013  (JP) .................. 2013-073145
(Continued)

(51) Int. Cl.
*B32B 27/08*     (2006.01)
*B32B 15/08*     (2006.01)
(Continued)

(52) U.S. Cl.
CPC ........ *B32B 27/08* (2013.01); *B29C 45/14688* (2013.01); *B32B 7/02* (2013.01);
(Continued)

(58) Field of Classification Search
CPC . B29C 45/14688; B32B 15/08; B32B 15/082; B32B 15/085; B32B 15/09;
(Continued)

(56) References Cited

U.S. PATENT DOCUMENTS 4,112,190 A * 9/1978 Sato .................. C08J 7/047
                                                156/273.3
6,190,765 B1 * 2/2001 Idehara .................. B41M 5/44
                                                428/206
(Continued)

FOREIGN PATENT DOCUMENTS

EP     0978374 A2    2/2000
JP     H0250835 A    2/1990
(Continued)

OTHER PUBLICATIONS

Office Action dated May 23, 2017, issued in Japanese Patent Application No. 2013-204237.
(Continued)

*Primary Examiner* — Lawrence D Ferguson
(74) *Attorney, Agent, or Firm* — Locke Lord LLP; James E. Armstrong, IV; Nicholas J. DiCeglie, Jr.

(57) ABSTRACT

The present invention provides a decorative sheet provided with three-dimensional moldability capable of sufficiently following the shape of a decorative resin molded article having a complicated surface shape. There is provided a decorative sheet composed of a layered body in which at least a substrate layer, a primer layer, and a thin metal film layer have been layered in sequence, and the primer layer contains a cured material having a resin in which the glass transition point is −30° C. to 80° C.

17 Claims, 3 Drawing Sheets

(30) Foreign Application Priority Data

| Sep. 30, 2013 | (JP) | 2013-204235 |
|---|---|---|
| Sep. 30, 2013 | (JP) | 2013-204236 |
| Sep. 30, 2013 | (JP) | 2013-204237 |

(51) Int. Cl.

| B32B 27/32 | (2006.01) |
|---|---|
| B32B 27/36 | (2006.01) |
| B32B 27/40 | (2006.01) |
| B29C 45/14 | (2006.01) |
| B32B 15/20 | (2006.01) |
| B32B 7/12 | (2006.01) |
| B32B 27/30 | (2006.01) |
| B32B 15/082 | (2006.01) |
| B32B 15/09 | (2006.01) |
| B32B 15/095 | (2006.01) |
| B32B 15/085 | (2006.01) |
| B32B 7/02 | (2019.01) |
| B32B 27/28 | (2006.01) |

(52) U.S. Cl.
CPC ............... *B32B 7/12* (2013.01); *B32B 15/08* (2013.01); *B32B 15/082* (2013.01); *B32B 15/085* (2013.01); *B32B 15/09* (2013.01); *B32B 15/095* (2013.01); *B32B 15/20* (2013.01); *B32B 27/283* (2013.01); *B32B 27/30* (2013.01); *B32B 27/306* (2013.01); *B32B 27/308* (2013.01); *B32B 27/32* (2013.01); *B32B 27/36* (2013.01); *B32B 27/40* (2013.01); *B32B 2307/402* (2013.01); *B32B 2307/4026* (2013.01); *B32B 2307/412* (2013.01); *B32B 2307/518* (2013.01); *B32B 2307/538* (2013.01); *B32B 2307/748* (2013.01); *B32B 2451/00* (2013.01)

(58) Field of Classification Search
CPC . B32B 15/095; B32B 15/20; B32B 2307/402; B32B 2307/4026; B32B 2307/412; B32B 2307/518; B32B 2307/538; B32B 2307/748
See application file for complete search history.

(56) References Cited

U.S. PATENT DOCUMENTS

| 6,458,464 | B1 * | 10/2002 | Takeda | B32B 15/08 |
|---|---|---|---|---|
| | | | | 428/457 |
| 2004/0028937 | A1 * | 2/2004 | Egashira | B05D 7/16 |
| | | | | 428/626 |
| 2009/0239069 | A1 | 9/2009 | Yonehama et al. | |

FOREIGN PATENT DOCUMENTS

| JP | 4-25456 A | 1/1992 |
|---|---|---|
| JP | 6-36864 A | 2/1994 |
| JP | 8-118539 A | 5/1996 |
| JP | 8-337097 A | 12/1996 |
| JP | 9-94937 A | 4/1997 |
| JP | 2000-43082 A | 2/2000 |
| JP | 3127398 B2 | 1/2001 |
| JP | 2001-129956 A | 5/2001 |
| JP | 2005-14266 A | 1/2005 |
| JP | 2005-246891 A | 9/2005 |
| JP | 2006-281451 A | 10/2006 |
| JP | 2007-176046 A | 7/2007 |
| JP | 2008-101453 A | 5/2008 |
| JP | 2008-110519 A | 5/2008 |
| JP | 2010-82963 A | 4/2010 |
| JP | 2010-229275 A | 10/2010 |
| JP | 2011-156662 A | 8/2011 |
| JP | 2012-076353 A | 4/2012 |
| WO | 2008/117842 A1 | 10/2008 |

OTHER PUBLICATIONS

Extended (Supplementary) European Search Report dated Sep. 27, 2016, issued in counterpart European Patent Application No. 144774813.7. (7 pages).

Intrenational Search Report dated Jun. 17, 2014, issued in counterpart Application No. PCT/JP2014/058333 (4pages).

Office Action dated Aug. 8, 2017, issued in Japanese Patent Application No. 2013-204236, with English machine translation. (6 pages).

Office Action dated Jan. 23, 2018, issued in counterpart Japanese Application No. 2013-204236, with English machine translation. (6 pages).

Office Action dated Apr. 24, 2018, issued in counterpart Japanese Application No. 2014-196997, with English translation (8 pages).

Office Action dated Sep. 25, 2018, issued in counterpart Japanese Application No. 2017-141137, with English machine translation. (6 pages).

Office Action issued in corresponding Japanese Patent Application No. JP 2018-171418, dated Oct. 23, 2019.

* cited by examiner

DECORATIVE SHEET AND DECORATIVE RESIN MOLDED ARTICLE

TECHNICAL FIELD

The present invention relates to a decorative sheet having a metallic-tone design. Further, the present invention relates to a decorative resin molded article obtained using the decorative sheet.

BACKGROUND ART

Members including a resin, the surface of which is subjected to metal plating, metal coating or the like, have been used heretofore for giving a metallic-tone design to vehicle interior and exterior components, building interior materials, cases for home electric appliances, and the like. However, when metal plating, metal coating or the like is performed, it is necessary to dispose waste water containing a metal, to take a measure against solvent vapor, and so on. Generally, the yield of these members is not high.

Thus, in recent years, decorative resin molded articles in which a decorative sheet having a metallic tone is laminated on the surface of a resin molded article have been used as the above-mentioned members. For production of a decorative resin molded article, for example, a molding method is used in which a decorative sheet given a design beforehand is integrated with a resin by injection molding.

Some decorative resin molded articles have a complicated surface shape such as a three-dimensional curved surface. Accordingly, decorative sheets are required to have three-dimensional moldability capable of sufficiently following the shape of a decorative resin molded article having a complicated surface shape. Particularly, decorative sheets having a metallic tone often have the problem that adhesion between a resin layer (e.g. base material layer, adhesive layer or the like) formed of a resin and a thin metal film layer formed of a metal is low. When adhesion between a resin layer and a thin metal film layer is low, delamination, floating or the like may occur between the resin layer and the thin metal film layer during molding of a decorative sheet, etc.

For example, Patent Document 1 discloses that a rear anchor layer formed of a resin is provided for improving adhesion between a metal deposition layer of metal deposition transfer material and an adhesive printing layer. In recent years, however, a decorative sheet capable of following the shape of a particularly complicated decorative resin molded article has been desired, and the decorative sheet may be stretched to a maximum draw ratio of 150% or more, for example, at a portion corresponding to the curved portion of the resin molded article. This means that a pan of a decorative sheet having a thin metal film layer is extended by a factor of 2.5 or more, and thus the molding conditions are very hard. Accordingly, conventional decorative sheets having a thin metal film layer cannot follow the shape of such a complicated decorative resin molded article, and have the problem that delamination, floating or the like occurs between a resin layer and a thin metal film layer during molding of a decorative sheet, etc.

Under these circumstances, a decorative sheet having three-dimensional moldability capable of sufficiently following the shape of a decorative resin molded article having a complicated surface shape is desired.

PRIOR ART DOCUMENT

Patent Document

Patent Document 1: JP Patent No. 3127398

SUMMARY OF THE INVENTION

Problems to be Solved by the Invention

A principal object of the present invention is to provide a decorative sheet having high three-dimensional moldability capable of sufficiently following the shape of a decorative resin molded article having a complicated surface shape.

Means for Solving the Problem

In order to achieve the above-mentioned object, the present inventors have extensively conducted studies. As a result, the present inventors have found that when in a decorative sheet including a laminated body with a base material layer, a first primer layer and a thin metal film layer laminated in this order, the first primer layer contains a cured product of a resin having a glass transition point of $-30°$ C. to $80°$ C., the decorative sheet can be given high three-dimensional moldability capable of sufficiently following the shape of a decorative resin molded article having a complicated surface shape. The present invention is an invention that has been completed by further conducting studies based on the above-mentioned findings.

That is, the present invention provides inventions of aspects as listed below.

Item 1. A decorative sheet including a laminated body with at least a base material layer, a first primer layer and a thin metal film layer laminated in this order, wherein the first primer layer contains a cured product of a resin having a glass transition point of $-30°$ C. to $80°$ C.

Item 2. The decorative sheet according to item 1, wherein the decorative sheet is used for decoration of a resin molded article having a curved portion, and the curved portion has a shape that requires the decorative sheet to be stretched at a maximum draw ratio of 150% or more.

Item 3. The decorative sheet according to item 1 or 2, wherein the resin having a glass transition point of $-30°$ C. to $80°$ C. is at least one selected from the group consisting of a polyester-based resin, a polyurethane-based resin, a polyacryl-based resin and a polyolefin-based resin.

Item 4. The decorative sheet according to any one of items 1 to 3, wherein the resin having a glass transition point of $-30°$ C. to $80°$ C. is a polyol resin, and the first primer layer is formed of a cured product of the polyol resin and an isocyanate compound.

Item 5. The decorative sheet according to item 4, wherein the polyol resin in the first primer layer is a polyester polyol.

Item 6. The decorative sheet according to item 4 or 5, wherein the isocyanate compound in the first primer layer is an aliphatic isocyanate compound.

Item 7. The decorative sheet according to any one of items 1 to 6, wherein an adhesive layer is provided between the base material layer and the first primer layer.

Item 8. The decorative sheet according to item 7, wherein the adhesive layer contains a chlorine-based resin.

Item 9. The decorative sheet according to item 8, wherein the first primer layer is formed of a resin composition containing a silane coupling agent.

Item 10. The decorative sheet according to item 8 or 9, wherein the chlorine-based resin is at least one selected from the group consisting of polyvinyl chloride, chlorinated polyethylene, polyvinylidene chloride, an ethylene-vinyl chloride copolymer, a vinyl chloride-vinyl acetate copolymer, polypropylene chloride and chlorinated polypropylene.

Item 11. The decorative sheet according to any one of items 1 to 10, wherein the first primer layer contains substantially no chlorine-based resin.

Item 12. The decorative sheet according to any one of items 1 to 11, wherein the thin metal film layer is formed of at least one selected from the group consisting of tin, indium, chromium, aluminum, nickel, copper, silver, gold, platinum, zinc and an alloy containing at least one of these metals.

Item 13. The decorative sheet according to any one of items 1 to 12, wherein a surface protective layer is further laminated on the thin metal film layer.

Item 14. The decorative sheet according to item 13, wherein a second primer layer is further provided between the thin metal film layer and the surface protective layer, and the second primer layer contains a cured product of a resin having a glass transition point of 55° C. to 110° C.

Item 15. The decorative sheet according to item 14, wherein the resin having a glass transition point of 55° C. to 110° C. is at least one selected from the group consisting of a polyester-based resin, a polyurethane-based resin, a polyacryl-based resin and a polyolefin-based resin.

Item 16. The decorative sheet according to item 14 or 15, wherein the resin having a glass transition point of 55° C. to 110° C. is a polyol resin, and the second primer layer is formed of a cured product of the polyol resin and an isocyanate compound.

Item 17. The decorative sheet according to item 16, wherein the polyol resin in the second primer layer is at least one of a polyester polyol and an acryl polyol.

Item 18. The decorative sheet according to item 16 or 17, wherein the isocyanate compound in the second primer layer is at least one of an aliphatic isocyanate compound and an aromatic isocyanate compound.

Item 19. The decorative sheet according to any one of items 1 to 18, wherein a transparent film layer is further laminated on the thin metal film layer.

Item 20. The decorative sheet according to any one of items 1 to 19, wherein the first primer layer further contains a colorant.

Item 21. A decorative resin molded article including a laminated body with at least a molded resin layer, a base material layer, a first primer layer and a thin metal film layer laminated in this order, wherein the first primer layer contains a cured product of a resin having a glass transition point of −30° C. to 80° C.

Item 22. The decorative resin molded article according to item 21, wherein an adhesive layer containing a chlorine-based resin is further provided between the base material layer and the first primer layer, and the first primer layer is formed of a resin composition containing a silane coupling agent.

Item 23. The decorative resin molded article according to item 21 or 22, wherein a second primer layer and a surface protective layer are further laminated in this order on the thin metal film layer, and the second primer layer contains a cured product of a resin having a glass transition point of 55° C. to 110° C.

Item 24. A method for producing a decorative resin molded article, the method including:

a vacuum molding step of molding the decorative sheet according to any one of items 1 to 20 into a three-dimensional shape beforehand by a vacuum molding die;

a trimming step of trimming off an unnecessary portion of the vacuum-molded decorative sheet to obtain a molded sheet; and an integration step of inserting the molded sheet into an injection molding die, closing the injection molding die, and injecting a fluidized resin into the injection molding die to integrate the resin with the molded sheet.

Item 25. The method for producing a decorative resin molded article according to item 24, wherein the decorative resin molded article has a curved portion, and the decorative sheet situated at the curved portion is stretched to a maximum draw ratio of 150% or more in at least one of the vacuum molding step and the integration step.

Advantages of the Invention

According to the decorative sheet of the present invention, there can be provided a decorative sheet having high three-dimensional moldability capable of sufficiently following the shape of a decorative resin molded article having a complicated surface shape, and a decorative resin molded article obtained using the decorative sheet.

EMBODIMENTS OF THE INVENTION

1. Decorative Sheet

Figure 1:
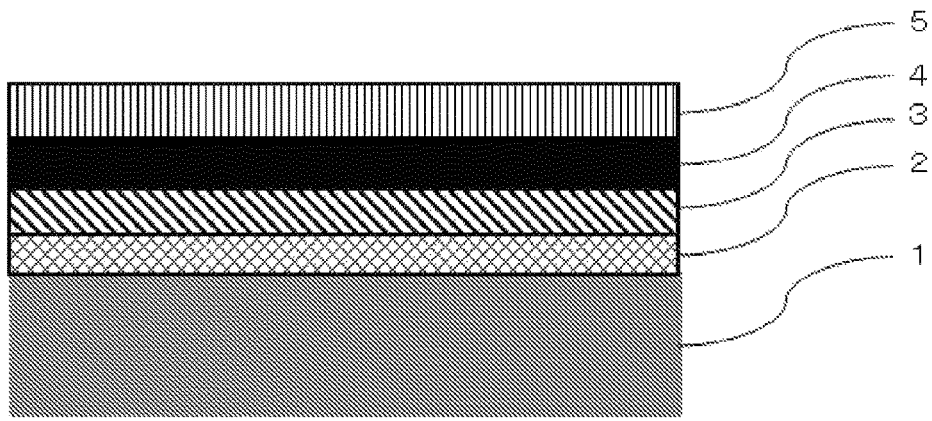
FIG. 1 is a schematic sectional view of one example of a decorative sheet according to the present invention.

A decorative sheet of the present invention includes a laminated body with at least a base material layer, a first primer layer and a thin metal film layer laminated in this order, wherein the first primer layer contains a cured product of a resin having a glass transition point of −30° C. to 80° C. In the decorative sheet of the present invention, the first primer layer provided between the base material layer and the thin metal film layer contains a cured product of a resin having a specific glass transition point as described above, and thus the decorative sheet is given high three-dimensional moldability capable of sufficiently following the shape of a decorative resin molded article having a complicated surface shape. Hereinafter, the decorative sheet of the present invention will be described in detail.

Laminated Structure of Decorative Sheet

The decorative sheet of the present invention has a laminated structure including at least a base material layer 1, a first primer layer 3 and a thin metal film layer 4 in this order. In the decorative sheet of the present invention, an adhesive layer 2 may be provided between the base material layer 1 and the first primer layer 3 as necessary for the purpose of, for example, improving adhesion between these layers. A surface protective layer 5 may be provided on the thin metal film layer 4 as necessary for the purpose of, for example, improving the scratch resistance and weather resistance of the decorative sheet. When a layer such as the surface protective layer 5 is to be provided on the thin metal film layer 4, a second primer layer 6 may be provided on the thin metal film layer 4 as necessary for the purpose of improving adhesion between the thin metal film layer 4 and a layer provided thereon. A transparent coloring layer 7 may be provided on the thin metal film layer 4 as necessary for the purpose of, for example, giving glossiness in addition to the metallic tone of the thin metal film layer 4. Under the surface protective layer 5, a third primer layer 8 may be provided immediately under the surface protective layer 5 as necessary for the purpose of, for example, improving adhesion with a layer neighboring the lower surface of the surface protective layer 5. A transparent film layer 9 etc. may be provided on the thin metal film layer 4 as necessary for the purpose of, for example, improving the moldability of the decorative sheet. Further, a second adhesive layer 10 etc. may be provided under the base material layer 1.

Examples of the laminated structure of the decorative sheet of the present invention include a laminated structure in which a base material layer, a first primer layer and a thin metal film layer are laminated in this order; a laminated structure in which an adhesive layer, a base material layer, a first primer layer and a thin metal film layer are laminated in this order; a laminated structure in which a base material layer, an adhesive layer, a first primer layer and a thin metal film layer are laminated in this order, a laminated structure in which a base material layer, an adhesive layer, a first primer layer, a thin metal film layer and a surface protective layer are laminated in this order; a laminated structure in which a base material layer, an adhesive layer, a first primer layer, a thin metal film layer, a second primer layer and a surface protective layer are laminated in this order; a laminated structure in which a base material layer, an adhesive layer, a first primer layer, a thin metal film layer, a transparent coloring layer, a third primer layer and a surface protective layer are laminated in this order, a laminated structure in which a base material layer, an adhesive layer, a first primer layer, a thin metal film layer, a second primer layer, a transparent coloring layer, a third primer layer and a surface protective layer are laminated in this order; a laminated structure in which a base material layer, an adhesive layer, a first primer layer, a thin metal film layer, a transparent film layer, a second primer layer, a transparent coloring layer, a third primer layer and a surface protective layer are laminated in this order; a laminated structure in which a base material layer, an adhesive layer, a first primer layer, a thin metal film layer, a second primer layer, a transparent film layer, a transparent coloring layer, a third primer layer and a surface protective layer are laminated in this order; a laminated structure in which a base material layer, an adhesive layer, a first primer layer, a thin metal film layer, a transparent film layer, a third primer layer and a surface protective layer are laminated in this order, a laminated structure in which a base material layer, an adhesive layer, a primer layer, a thin metal film layer, a transparent film layer and a surface protective layer are laminated in this order; a laminated structure in which a base material layer, an adhesive layer, a first primer layer, a thin metal film layer and a transparent film layer are laminated in this order; and a laminated structure in which a base material layer, an adhesive layer, a first primer layer, a thin metal film layer, a second primer layer and a transparent film layer are laminated in this order.

Figure 2:
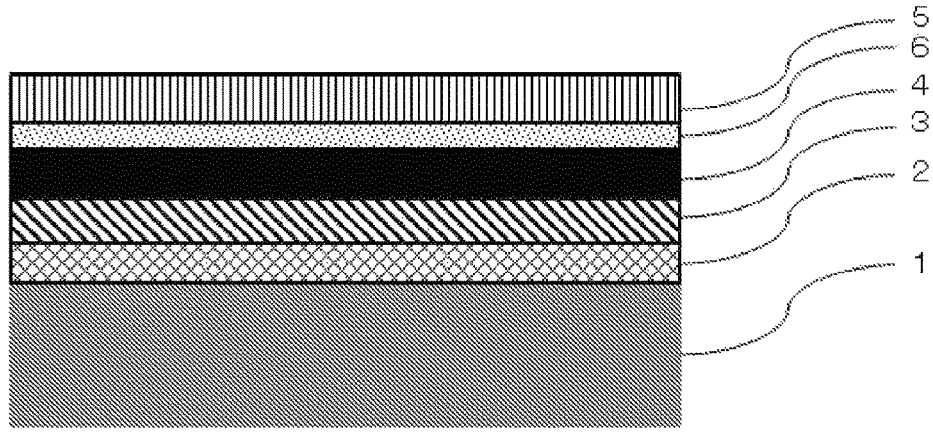
FIG. 2 is a schematic sectional view of one example of a decorative sheet according to the present invention.
Figure 3:
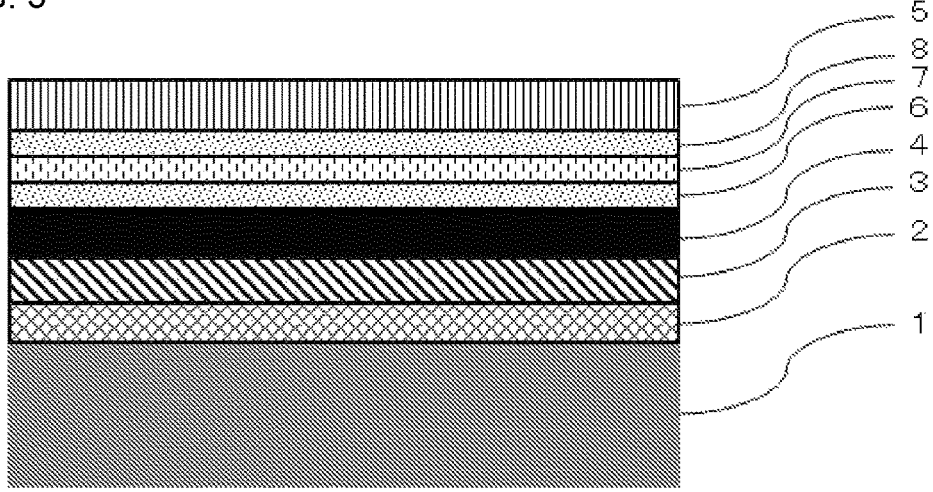
FIG. 3 is a schematic sectional view of one example of a decorative sheet according to the present invention.
Figure 4:
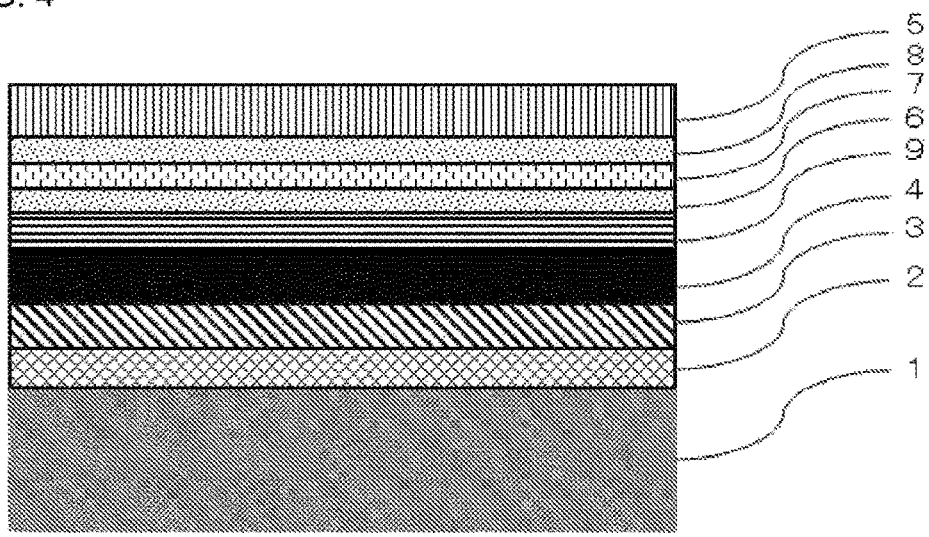
FIG. 4 is a schematic sectional view of one example of a decorative sheet according to the present invention.
Figure 5:
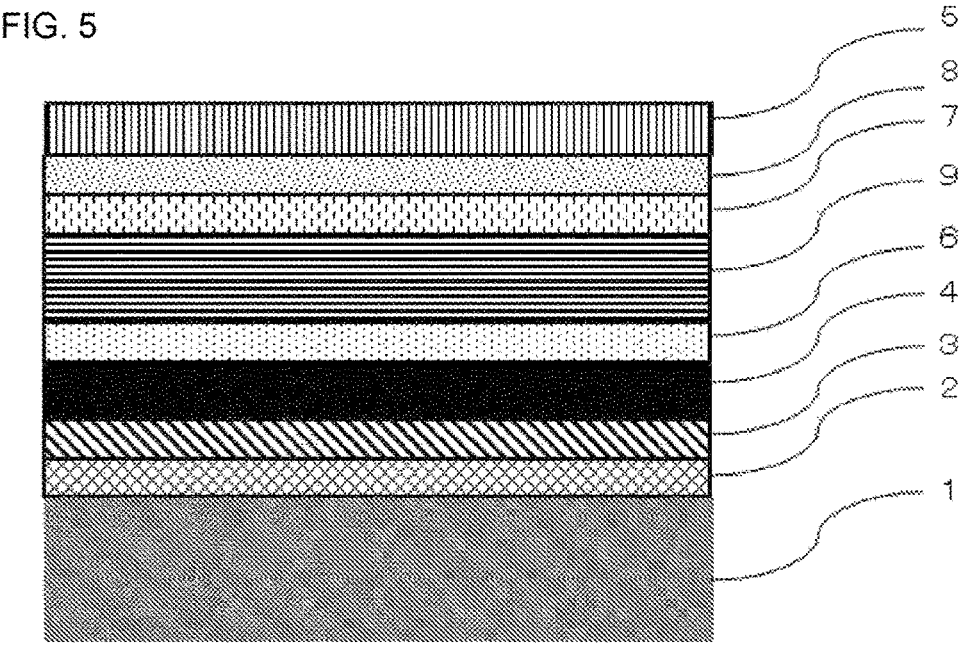
FIG. 5 is a schematic sectional view of one example of a decorative sheet according to the present invention.

As one aspect of the laminated structure of the decorative sheet of the present invention, FIG. 1 shows a schematic sectional view of one example of a decorative sheet in which a base material layer, an adhesive layer, a first primer layer, a thin metal film layer and a surface protective layer are laminated in this order. As one aspect of the laminated structure of the decorative sheet of the present invention, FIG. 2 shows a schematic sectional view of one example of a decorative sheet in which a base material layer, an adhesive layer, a first primer layer, a thin metal film layer, a second primer layer and a surface protective layer are laminated in this order. As one aspect of the laminated structure of the decorative sheet of the present invention, FIG. 3 shows a schematic sectional view of one example of a decorative sheet in which a base material layer, an adhesive layer, a first primer layer, a thin metal film layer, a second primer layer, a transparent coloring layer, a third primer layer and a surface protective layer are laminated in this order. As one aspect of the laminated structure of the decorative sheet of the present invention, FIG. 4 shows a schematic sectional view of one example of a decorative sheet in which a base material layer, an adhesive layer, a first primer layer, a thin metal film layer, a transparent film layer, a second primer layer, a transparent coloring layer, a third primer layer and a surface protective layer are laminated in this order. As one aspect of the laminated structure of the decorative sheet of the present invention, FIG. 5 shows a schematic sectional view of one example of a decorative sheet in which a base material layer, an adhesive layer, a first primer layer, a thin metal film layer, a second primer layer, a transparent film layer, a transparent coloring layer, a third primer layer and a surface protective layer are laminated in this order.

Compositions of Layers Forming Decorative Sheet

[Base Material Layer 1]

The base material layer 1 is formed of a resin sheet (resin film) that serves as a support in the decorative sheet of the present invention. The resin component to be used in the base material layer 1 is not particularly limited, and may be appropriately selected according to three-dimensional moldability and compatibility with a molded resin layer, but a thermoplastic resin is preferable. Specific examples of the thermoplastic resin include acrylonitrile-butadiene-styrene resins (hereinafter, referred to as "ABS resins" in some cases); acrylonitrile-styrene-acrylic acid ester resins; acrylic resins; polyolefin-based resins such as polypropylene and polyethylene; polycarbonate resins; vinyl chloride-based resins; and polyethylene terephthalate (PET). Among them, ABS resins are preferable from the viewpoint of three-dimensional moldability. The resin components that form the base material layer 1 may be used alone, or may be used in combination of two or more thereof. The base material layer 1 may be formed of a single-layer sheet of the above-mentioned resin, or may be formed of a multi-layer sheet of the same resin or different resins. An approach to improving the three-dimensional moldability of the decorative sheet by providing a multi-layer sheet as the base material layer 1 is conceivable, but the decorative sheet of the present invention includes the specific first primer layer 3 described later, and therefore has high three-dimensional moldability even when the base material layer 1 is a single-layer sheet.

One or both of the surfaces of the base material layer 1 may be subjected to a physical or chemical surface treatment such as an oxidation method or a roughening method as necessary for improving adhesion with the first primer layer 3 or adhesive layer 2 described later. Examples of the oxidation method that is carried out as a surface treatment of the base material layer 1 include corona discharge treatment, plasma treatment, chromium oxidation treatment, flame treatment, hot air treatment and ozone/ultraviolet treatment methods. Examples of the roughening method that is carried out as a surface treatment of the base material layer 1 include sand blasting methods and solvent treatment methods. The surface treatment is appropriately selected according to a type of resin component that forms the base material layer 1, but a corona discharge treatment method is preferable from the viewpoint of an effect, handling characteristics and so on.

The base material layer 1 may be colored by blending a colorant etc., coated for arranging the color, or provided with a pattern for giving design property.

The thickness of the base material layer 1 is not particularly limited, and is appropriately set according to a use purpose of the decorative sheet, etc., but it is normally about 50 to 800 μm, preferably about 100 to 600 μm, further preferably about 200 to 500 μm. When the thickness of the base material layer 1 falls within the above-mentioned range, further excellent three-dimensional moldability, design property and so on can be imparted to the decorative sheet.

[Adhesive Layer 2]

The adhesive layer 2 is a layer that is provided between the base material layer 1 and the thin metal film layer 4 as necessary for improving adhesion between the base material layer 1 and the first primer layer 3 described later.

The resin that forms the adhesive layer 2 is not particularly limited as long as it can improve adhesion between the base material layer 1 and the first primer layer 3, and examples thereof include thermoplastic resins. The thermoplastic resin is not particularly limited, and examples thereof include acryl resins; polyolefin resins such as polypropylene and polyethylene; polycarbonate resins; ABS resins; polyester resins such as polyethylene terephthalate (PET) and polyethylene naphthalate (PEN); polyvinyl chloride-based resins such as polyvinyl chloride, chlorinated polyethylene, polyvinylidene chloride, ethylene-vinyl chloride copolymers, vinyl chloride-vinyl acetate copolymers and vinyl chloride-vinyl acetate-(meth)acryl copolymers; and chlorine-based resins such as polypropylene chloride and chlorinated polypropylene. As the resin that forms the adhesive layer 2, acryl resins and chlorine-based resins are preferably used for improving adhesion between the base material layer 1 and the first primer layer 3. The chlorine-based resin is preferably a vinyl chloride resin or a vinyl chloride-vinyl acetate copolymer, more preferably a vinyl chloride-vinyl acetate copolymer for improving adhesion between the base material layer 1 and the first primer layer 3, etc. The resins that form the adhesive layer 2 may be used alone, or may be used in combination of two or more thereof. In the present invention, the term "(meth)acryl" is a general term of "acryl" and "methacryl", and the same applies to other similar terms that include the prefix "(meth)".

When for example, a mixed resin of an acryl resin and a chlorine-based resin is used as the resin that forms the adhesive layer 2, the mass ratio of the acryl resin and the chlorine-based resin in the resin that forms the adhesive layer 2 is preferably about 20/80 to 80/20, more preferably about 30/70 to 70/30 for improving adhesion between the base material layer 1 and the first primer layer 3.

A chlorine-based resin is suitable as a resin that forms the adhesive layer 2 because high adhesion is achieved, but it has the problem that a metal that forms a thin metal film layer is oxidized to fade the thin metal film layer. In the present invention, however, since the first primer layer 3 described later is disposed between the adhesive layer 2 and the thin metal film layer 4, fading of the thin metal film layer 4 is suppressed even when a chlorine-based resin is used as the resin that forms the adhesive layer 2.

When the adhesive layer 2 contains a chlorine-based resin, the acid value of the chlorine-based resin is not particularly limited, but it is preferably 1 mg KOH/g or more, more preferably 4 mg KOH/g or more, further preferably more than 6 mg KOH/g for further improving adhesion between the base material layer 1 and the first primer layer 3. In the present invention, even when the adhesive layer 2 is formed of a chlorine-based resin having a high acid value, for example, a chlorine-based resin having an acid value of more than 6 mg KOH, the base material layer 1 and the thin metal film layer 4 can be bonded to each other with high adhesion to improve three-dimensional moldability of the decorative sheet while fading of the thin metal film layer 4 is suppressed because the thin metal film layer 4 is protected by the first primer layer 3 as described above. However, when the acid value of the chlorine-based resin is excessively high, fading of the thin metal film layer 4 may be promoted, and therefore it is preferable that the acid value is normally 12 mg KOG/g or less.

When the adhesive layer 2 is provided, the thickness of the adhesive layer 2 is not particularly limited, but it may be about 0.6 to 3.5 μm, preferably about 1 to 2 μm for improving adhesion between the base material layer 1 and the first primer layer 3 described later.

The method for forming the adhesive layer 2 is not particularly limited. For example, the adhesive layer 2 can be formed by a heat-sealing or dry lamination method with the above-mentioned resin applied onto a surface of one of the base material layer 1 and the first primer layer 3 described later.

[First Primer Layer 3]

The first primer layer 3 is a layer that is provided for giving high three-dimensional moldability to the decorative sheet of the present invention, so that the decorative sheet can sufficiently follow the shape of a decorative resin molded article having a complicated surface shape. Specifically, the first primer layer 3 is provided for ensuring that even when the decorative sheet of the present invention is used for decoration of a resin molded article having a curved portion, and the curved portion has a shape that requires the decorative sheet of the present invention to be stretched at, for example, a maximum draw ratio of 150% or more, or even about 200%, the decorative sheet can follow such a shape. In the present invention, the first primer layer 3 contains a cured product of a resin having a glass transition point (Tg) of −30° C. to 80° C., and owing to this feature, the decorative sheet is given high three-dimensional moldability as described above. The upper limit value of the maximum draw ratio is preferably about 250%.

The first primer layer 3 has a function of adhering the base material layer 1 and the thin metal film layer 4 to each other. When the adhesive layer 2 is provided between the base material layer 1 and the first primer layer 3, the adhesive layer 2 adheres the base material layer 1 and the first primer layer 3 to each other, and the first primer layer 3 adheres the adhesive layer 2 and the thin metal film layer 4 to each other. In the present invention, the first primer layer 3 is disposed in such a manner that the adhesive layer 2 and the thin metal film layer 4 are not in direct contact with each other as described above, and therefore fading of the thin metal film layer 4 which occurs when the adhesive layer 2 and the thin metal film layer 4 are in direct contact with each other can be effectively prevented.

For further improving the three-dimensional moldability of the decorative sheet, the first primer layer 3 contains preferably a cured product of a resin having a glass transition point of −20 to 70° C., more preferably a cured product of a resin having a glass transition point of −10 to 40° C., further preferably a cured product of a resin having a glass transition point of 0 to 20° C. When the glass transition point of the resin contained in the first primer layer 3 is excessively low, adhesion with the thin metal film layer 4 may be reduced, leading to occurrence of delamination, floating or the like between the layers due to, for example, heating during molding of the decorative sheet, and further when the adhesive layer 2 contains a chlorine-based resin, the thin metal film layer 4 is easily faded. On the other hand, when the glass transition point of the resin contained in the first primer layer 3 is excessively high, the first primer layer 3 may be thermally shrunk due to, for example, heating during molding of the decorative sheet, leading to delamination, floating or the like between the layers of the decorative sheet. In the present invention, the glass transition point (Tg) is a value obtained by differential scanning calorimetry (DSC) based on JIS K7121-1987.

The content of resins having a glass transition point (Tg) of −30° C. to 80° C. among resins that are cured to form the first primer layer 3 is preferably 50% by mass or more, more preferably 70% by mass or more, further preferably 90% by mass or more. Especially preferably, the resins that are cured to form the first primer layer 3 include only resins having a glass transition point (Tg) of −30° C. to 80° C.

The resin that is cured to form the first primer layer 3 is not particularly limited as long as it is a resin which has a glass transition point (Tg) of −30° C. to 80° C. and which can be cured by drying, chemical reaction or the like to form a coating film, and examples thereof include thermosetting resins and thermoplastic resins, preferably polyester-based resins, polyurethane-based resins, polyacryl-based resins and polyolefin-based resins. The resin contained in the first primer layer 3 is more preferably a polyester-based resin for suppressing fading of the thin metal film layer 4 when the adhesive layer 2 contains a chlorine-based resin while further improving the three-dimensional moldability of the decorative sheet. The resins having a glass transition point (Tg) of −30° C. to 80° C. may be used alone, or may be used in combination of two or more thereof.

The above-mentioned polyester-based resin, polyurethane-based resin, polyacryl-based resin and polyolefin-based resin are not particularly limited, but for improving the three-dimensional moldability of the decorative sheet, and also suppressing fading of the thin metal film layer 4 when the adhesive layer 2 contains a chlorine-based resin, for example, the polyether-based resin is a polyester polyol; the polyurethane-based resin is a urethane polyol such as a polyester urethane polyol or an acryl urethane polyol; the polyacryl-based resin is an acryl polyol; and the polyolefin-based resin is a polyolefin polyol such as a polyethylene polyol, a polypropylene polyol, a polybutadiene polyol or a polyisoprene polyol.

Examples of the polyester polyol include condensed polyester diols obtained by reacting a low-molecular diol and a dicarboxylic acid, polylactone diols obtained by ring-opening polymerization of a lactone, and polycarbonate diols. Examples of the dicarboxylic acid include aliphatic dicarboxylic acids such as succinic acid, adipic acid, sebacic acid, glutaric acid, azelaic acid, maleic acid and fumaric acid, and aromatic dicarboxylic acids such as terephthalic acid and isophthalic acid. As the lactone, for example, ε-caprolactone is used. Specific examples of the polyester polyol include polyethylene adipate, polybutylene adipate, polyhexamethylene adipate, polyneopentyl adipate, polyethylene butylene adipate, polybutylene hexabutylene adipate, polydiethylene adipate, poly(polytetramethylene ether)adipate, polyethylene azate, polyethylene sebacate, polybutylene azate, polybutylene sebacate and polyhexamethylene carbonate diol.

Preferably, the first primer layer 3 in the present invention is formed of a cured product of a curing agent and the resin having a glass transition point (Tg) of −30° C. to 80° C. More preferably, the first primer layer 3 in the present invention is formed of a reaction-curable urethane resin that is obtained from a polyol resin having a glass transition point (Tg) of −30° C. to 80° C., and a curing agent composed of an isocyanate compound or the like. The polyol resin having a glass transition point (Tg) of −30° C. to 80° C. is not particularly limited, and examples thereof include the above-mentioned polyols such as the polyester-based resins, polyurethane-based resins, polyacryl-based resins and polyolefin-based resins shown above as an example.

Examples of the isocyanate compound include aromatic isocyanates such as 2,4-tolylene diisocyanate, 2,6-tolylene diisocyanate, xylene-1,4-diisocyanate, xylene-1,3-diisocyanate, 4,4'-diphenylmethane diisocyanate, 2,4'-diphenylmethane diisocyanate, 2,2'-diphenylmethane diisocyanate, 4,4'-diphenylether diisocyanate, polymethylene polyphenylene polyisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate and 3,3'-dimethoxydiphenyl-4,4'-diisocyanate; aliphatic isocyanates such as 1,4-diisocyanatobutane, 1,5-diisocyanatopentane, 1,6-diisocyanatohexane (1,6-hexamethylene diisocyanate, HDI), 1,6-diisocyanato-2,2,4-trimethylhexane and 2,6-diisocyanatohexanoic acid methyl (lysine diisocyanate); and cycloaliphatic isocyanates such as isophorone diisocyanate, hydrogenated xylylene diisocyanate and hydrogenated diphenylmethane diisocyanate. Among them, aliphatic isocyanates are preferable for suppressing delamination between layers due to heating during molding of the decorative sheet. The curing agents may be used alone, or may be used in combination of two or more thereof.

When the curing agent is to be used in the first primer layer 3, the content of the curing agent is not particularly limited, but for effectively suppressing fading of the thin metal film layer 4 while improving adhesion between the base material layer 1 and the thin metal film layer 4, the content of the curing agent is preferably about 1 to 15 parts by mass, more preferably about 3 to 10 parts by mass based on 100 parts by mass of the resin that forms the first primer layer 3.

The reaction-curable urethane resin that forms the first primer layer 3 may be either a one-liquid curable type or a two-liquid curable type, and is preferably a two-liquid curable type.

In the present invention, when the adhesive layer 2 contains a chlorine-based resin, and the first primer layer 3 contains a silane coupling agent, the adhesive layer 2 formed of a resin and the thin metal film layer 4 formed of a metal can be bonded to each other with high adhesion by the first primer layer 3 while fading of the thin metal film layer 4 is suppressed.

The silane coupling agent contained in the resin composition that forms the first primer layer 3 is not particularly limited, and examples thereof include vinyl-based silane coupling agents, mercapto-based silane coupling agents, (meth)acryl-based silane coupling agents, epoxy-based silane coupling agents and amino-based silane coupling agents.

Examples of the vinyl-based silane coupling agent include vinyltriethoxysilane, vinyltrimethoxysilane, vinylmethyldiethoxysilane, vinylmethyldimethoxysilane and vinyltris(2-methoxyethoxy)silane. Examples of the mercapto-based silane coupling agent include 3-mercaptopropyltriethoxysilane and 3-mercaptopropyltrimethoxysilane. Examples of the (meth)acryl-based silane coupling agent include 3-methacryloxypropyltriethoxysilane and 3-methacryloxypropyltrimethoxysilane. Examples of the epoxy-based silane coupling agent include 3-glycidoxypropyltriethoxysilane and 3-glycidoxypropyltrimethoxysilane. Examples of the amino-based silane coupling agent include 3-aminopropyltriethoxysilane and 3-aminopropyltrimethoxysilane.

Among them, vinyl-based silane coupling agents and mercapto-based silane coupling agents are preferable for improving the moldability of the decorative sheet, and suppressing fading of the thin metal film layer 4 while improving adhesion between the adhesive layer 2 and the thin metal film layer 4. The silane coupling agents may be used alone, or may be used in combination of two or more thereof.

The content of the silane coupling agent contained in the first primer layer 3 is not particularly limited, but it is preferably about 1 to 10 parts by mass, more preferably about 5 to 15 parts by mass based on 100 parts by mass of the resin contained in the first primer layer 3.

As above, when in the decorative sheet of the present invention which is provided with the first primer layer 3, the first primer layer 3 contains a silane coupling agent, the adhesive layer 2 formed of a resin and the thin metal film layer 4 formed of a metal can be bonded to each other with high adhesion by the first primer layer 3. The decorative sheet of the present invention which includes the specific first primer layer 3 as described above also has excellent three-dimensional moldability.

For more effectively suppressing fading of the thin metal film layer 4, it is preferable that the first primer layer 3 contains substantially no chlorine-based resin. In the present invention, the first primer layer 3 containing substantially no chlorine-based resin means that for example, the ratio of a chlorine-based resin contained in the first primer layer 3 is 1% by mass or less. The acid value of the resin that forms the first primer layer 3 is preferably 6 mg KOH/g or less.

The first primer layer 3 may further contain a colorant in addition to the above-mentioned resin for the purpose of, for example, arranging the color of the decorative sheet, or improving design property of the decorative sheet. Particularly, when the first primer layer 3 contains a colorant having a color similar to that of, for example, the thin metal film layer 4, deterioration of the metallic-tone design property of the decorative sheet can be effectively suppressed even when the thin metal film layer 4 is faded. As such a colorant, one capable of presenting a metallic tone with the thin metal film layer 4 when blended in the first primer layer 3 may be appropriately selected, and for example, a pigment, a dye or the like can be used. Specific examples of the colorant include inorganic pigments such as carbon black, iron black, titanium white (titanium oxide), antimony white, chrome yellow, titanium yellow, rouge, cadmium red, ultramarine and cobalt blue, organic pigments or dyes such as quinacridone red, isoindolinone yellow and phthalocyanine blue, metallic pigments composed of scale-like foil pieces of aluminum, brass or the like, and pearlescent (pearl) pigments composed of scale-like foil pieces of titanium dioxide-coated mica, basic lead carbonate or the like. For coloring the first primer layer 3 into a metallic tone, for example, a white colorant as a base, such as titanium oxide, may be used in combination with a black-based colorant such as carbon black. It is also preferable that depending on a type of the metal that forms the thin metal film layer 4, colorants of other systems are further added to present a color closer to that of the thin metal film layer 4. For example, tin and chromium have a metallic tone tinged with yellow, and therefore when these metals are used, a yellowish colorant may be further added. Indium and aluminum have a bluish-white metallic tone, and therefore when these metals are used, a bluish colorant may be further added. For securing both adhesion between the first primer layer 3 and the thin metal film layer 4 and fading resistance of the thin metal film layer 4, the mass ratio of the resin that forms the first primer layer 3, and the colorant (resin:colorant) is preferably about 90:10 to 60:40, more preferably about 80:20 to 70:30.

The thickness of the first primer layer 3 is not particularly limited, but it is preferably about 0.5 to 3 μm, more preferably about 1 to 2 μm for improving the three-dimensional moldability of the decorative sheet.

The first primer layer 3 is formed using a primer composition containing the above-mentioned resin. Specifically, the first primer layer 3 is formed by a normal coating method such as gravure coating, gravure reverse coating, gravure offset coating, spinner coating, roll coating, reverse roll coating, kiss coating, wheeler coating, dip coating, solid coating with a silk screen, wire bar coating, flow coating, comma coating, pour coating, blushing or spray coating, or a transfer coating method using a primer composition. Here, the transfer coating method is a method in which a coating film of the first primer layer 3 is formed on a thin sheet (film base material), and thereafter the intended surface of the layer in the decorative sheet is coated with the coating film.

[Thin Metal Film Layer 4]

The thin metal film layer 4 is a layer that is provided on the first primer layer 3 to give a metallic-tone design similar to a metal surface to the decorative sheet.

The metal that forms the thin metal film layer 4 is not particularly limited as long as it is a metal capable of giving a metallic-tone design to the decorative sheet, and examples thereof include tin, indium, chromium, aluminum, nickel, copper, silver, gold, platinum, zinc and an alloy containing at least one of these metals. Among them, tin, indium and chromium are preferable because they have high spreadability. When the thin metal film layer 4 is formed of a metal having high spreadability, there is the advantage that cracks are hardly generated in three-dimensional molding of the decorative sheet. The thin metal film layer 4 may be formed of one metal, or may be formed of two or more metals.

The method for forming the thin metal film layer 4 is not particularly limited, but for example, vapor deposition methods such as a vacuum vapor deposition method, a sputtering method and an ion plating method each using the above-mentioned metal are preferable for giving to the decorative sheet a metallic-tone having a high feel of material and presenting an image of high quality. Particularly, the vacuum vapor deposition method is preferable because it is inexpensive and does not cause significant damage to the vapor deposition object. Conditions for vapor deposition may be appropriately set according to a melting temperature or evaporation temperature of a metal to be used. Besides the above-mentioned vapor deposition method, a method including applying a paste containing the above-mentioned metal, a plating method using the above-mentioned metal, and so on can be used.

The thickness of the thin metal film layer 4 is not particularly limited, but it is preferably about 0.6 to 1.8, more preferably 0.8 to 1.4 in terms of an optical density (OD) value for improving the design property and moldability of the decorative sheet.

[Surface Protective Layer 5]

The surface protective layer 5 is a layer that is provided on the outermost surface of the decorative sheet as necessary for the purpose of improving the scratch resistance, weather resistance and the like of the decorative sheet. The material that forms the surface protective layer 5 is not particularly limited, but normally a resin, preferably an onizing radiation curable resin, is used. Hereinafter, formation of the surface protective layer 5 from an onizing radiation curable resin will be described in detail.

(Onizing Radiation Curable Resin)

The onizing radiation curable resin to be used for formation of the surface protective layer 5 is a resin that is crosslinked and cured when irradiated with an ionizing radiation, and specific examples thereof include those in which at least one of prepolymers, oligomers and monomers each having a polymerizable unsaturated bond or an epoxy group in the molecule is appropriately mixed. Here, the ionizing radiation means an electromagnetic wave or charged particle ray having an energy quantum capable of polymerizing or crosslinking a molecule, and normally an ultraviolet (UV) ray or an electron beam (EB) is used, but the ionizing radiations also include electromagnetic waves such as an X-ray and a γ-ray, and charged particle rays such as an α-ray and an ion beam. Among onizing radiation curable resins, electron beam-curable resins are suitably used in formation of the surface protective layer 5 because they can be made solventless, do not require an initiator for photopolymerization, and exhibit stable curing characteristics.

As the monomer to be used as an onizing radiation curable resin, (meth)acrylate monomers having a radical-polymerizable unsaturated group in the molecule are suitable, and among them, polyfunctional (meth)acrylate monomers are preferable. The polyfunctional (meth)acrylate monomer is only required to be a (meth)acrylate monomer having two or more polymerizable unsaturated bonds in the molecule (di-or-more functional), preferably three or more polymerizable unsaturated bonds in the molecule (tri-or-more functional). Specific examples of the polyfunctional (meth) acrylate include ethylene glycol di(meth)acrylate, propylene glycol di(meth)acrylate, 1,4-butanediol di(meth)acrylate, 1,6-hexanediol di(meth)acrylate, neopentyl glycol di(meth) acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth) acrylate, ethylene oxide-modified trimethylolpropane tri (meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta (meth)acrylate, dipentaerythritol hexa(meth)acrylate, ethylene oxide-modified dipentaerythritol hexa(meth)acrylate and caprolactone-modified dipentaerythritol hexa(meth) acrylate. These monomers may be used alone, or may be used in combination of two or more thereof.

As the oligomer to be used as an onizing radiation curable resin, (meth)acrylate oligomers having a radical-polymerizable unsaturated group in the molecule are suitable, and among them, polyfunctional (meth)acrylate oligomers having two or more polymerizable unsaturated bonds in the molecule (di-or-more functional) are preferable. Examples of the polyfunctional (meth)acrylate oligomer include polycarbonate (meth)acrylate, acrylic silicone (meth)acrylate, urethane (meth)acrylate, epoxy (meth)acrylate, polyester (meth)acrylate, polyether (meth)acrylate, polybutadiene (meth)acrylate, silicone (meth)acrylate, and oligomers having a cation-polymerizable functional group in the molecule (e.g. novolac-type epoxy resins, bisphenol-type epoxy resins, aliphatic vinyl ethers, aromatic vinyl ethers and so on). Here, the polycarbonate (meth)acrylate is not particularly limited as long as it has a carbonate bond on the polymer main chain, and has a (meth)acrylate group at the end or side chain, and the polycarbonate (meth)acrylate can be obtained by esterifying a polycarbonate polyol with (meth)acrylic acid. The polycarbonate (meth)acrylate may be, for example, urethane (meth)acrylate having a polycarbonate backbone. The urethane (meth)acrylate having a polycarbonate backbone is obtained by, for example, reacting a polycarbonate polyol, a polyvalent isocyanate compound and hydroxy (meth)acrylate. The acrylic silicone (meth) acrylate can be obtained by radical-copolymerizing a silicone macro-monomer with a (meth)acrylate monomer. The urethane (meth)acrylate can be obtained by, for example, esterifying a polyurethane oligomer with (meth)acrylic acid, the polyurethane oligomer being obtained by reaction of a polyether polyol or a polyester polyol with a polyisocyanate compound. The epoxy (meth)acrylate can be obtained by, for example, reacting (meth)acrylic acid with an oxirane ring of a relatively low-molecular-weight bisphenol-type epoxy resin or novolac-type epoxy resin to perform esterification. Carboxyl-modified epoxy (meth)acrylate obtained by partially modifying the epoxy (meth)acrylate with a dibasic carboxylic anhydride can also be used. For example, the polyester (meth)acrylate can be obtained by esterifying hydroxyl groups of a polyester oligomer with (meth)acrylic acid, the polyester oligomer being obtained by condensation of a polyvalent carboxylic acid and a polyhydric alcohol and having a hydroxyl group at each of both ends, or by esterifying a hydroxyl group at the end of an oligomer with (meth)acrylic acid, the oligomer being obtained by adding an alkylene oxide to a polyvalent carboxylic acid. The polyether (meth)acrylate can be obtained by esterifying a hydroxyl group of a polyether polyol with (meth)acrylic acid. The polybutadiene (meth)acrylate can be obtained by adding (meth)acrylic acid to the side chain of a polybutadiene oligomer. The silicone (meth)acrylate can be obtained by adding (meth)(meth)acrylic acid to the end or side chain of a silicone having a polysiloxane bond on the main chain. These oligomers may be used alone, or may be used in combination of two or more thereof.

Among the above-mentioned onizing radiation curable resins, polycarbonate (meth)acrylate is preferably used for obtaining excellent three-dimensional moldability. More preferably, polycarbonate (meth)acrylate and urethane (meth)acrylate are used in combination for securing both three-dimensional moldability and scratch resistance.

These curable resins may be used alone, or may be used in combination of two or more thereof.

(Other Added Components)

According to desired properties to be imparted to the surface protective layer 5, various kinds of additives can be blended in the onizing radiation curable resin composition that forms the surface protective layer 5. Examples of the additives include weather resistance improving agents such as ultraviolet absorbers and light stabilizers, abrasion resistance improvers, polymerization inhibitors, crosslinkers, infrared absorbers, antistatic agents, bondability improvers, leveling agents, thixotropy imparting agents, coupling agents, plasticizers, antifoaming agents, fillers, solvents and colorants. The additives can be appropriately selected from those that are commonly used. As the ultraviolet absorber and light stabilizer, a reactive ultraviolet absorber and light stabilizer having a polymerizable group such as a (meth) acryloyl group in the molecule can also be used.

(Thickness of Surface Protective Layer 5)

The thickness of the surface protective layer 5 after curing is not particularly limited, but it is, for example, 1 to 1000 μm, preferably 1 to 50 μm, further preferably 1 to 30 μm. When the thickness of the surface protective layer 5 after curing falls within the above-mentioned range, sufficient properties as a surface protective layer, such as scratch resistance and weather resistance, are obtained, and in the case where the surface protective layer 4 is formed using an onizing radiation curable resin, the resin can be uniformly irradiated with an ionizing radiation, and therefore can be uniformly cured, thus being advantageous in terms of economy. Further, when the thickness of the base material layer 5 after curing falls within the above-mentioned range, the three-dimensional moldability of the decorative sheet is further improved, and therefore high followability to a complicated three-dimensional shape in automobile interior applications or the like can be obtained. Thus, the decorative sheet of the present invention is also useful as a decorative sheet particularly of a member required to have the surface protective layer 5 having a large thickness, e.g. a vehicle exterior component etc. because sufficiently high three-dimensional moldability are obtained even when the thickness of the surface protective layer 5 is made larger as compared to conventional ones.

(Formation of Surface Protective Layer 5)

Formation of the surface protective layer 5 is performed by, for example, preparing an onizing radiation curable resin composition containing an onizing radiation curable resin, and applying and crosslinking/curing the onizing radiation curable resin composition. The viscosity of the onizing radiation curable resin composition is not limited as long as an uncured resin layer can be formed on the surface of the second primer layer 6, the thin metal film layer 4 or the like by an application method as described later.

In the present invention, an uncured resin layer is formed by applying a prepared application liquid onto the thin metal film layer 4, the later-described second primer layer 6 provided as necessary, or the like using a known method such as gravure coating, bar coating, roll coating, reverse roll coating or comma coating, preferably gravure coating, in such a manner that the above-mentioned thickness is obtained.

The uncured resin layer formed in this manner is irradiated with an ionizing radiation such as an electron beam or an ultraviolet ray to cure the uncured resin layer, so that the surface protective layer 5 is formed. When an electron beam is used as the ionizing radiation, an accelerating voltage thereof can be appropriately selected according to a resin to be used and a thickness of the layer, but the accelerating voltage is normally about 70 to 300 kV.

In irradiation of an electron beam, the transmission capacity increases as the accelerating voltage becomes higher, and therefore when a resin that is easily degraded by irradiation of an electron beam is used in a layer under the surface protective layer 5, an accelerating voltage is selected so that the transmission depth of the electron beam is substantially equal to the thickness of the surface protective layer 5. Accordingly, a layer situated under the surface protective layer 5 can be inhibited from being excessively irradiated with an electron beam, so that degradation of the layers by an excessive electron beam can be minimized.

The amount of radiation is preferably an amount with which the crosslinking density of the surface protective layer 5 is saturated, and the amount of radiation is selected within a range of normally 5 to 300 kGy (0.5 to 30 Mrad), preferably 10 to 50 kGy (1 to 5 Mrad).

Further, the electron beam source is not particularly limited, and various kinds of electron beam accelerators can be used such as, for example, those of Cockcroft-Walton type, van de graaff type, tuned transformer type, insulated core transformer type, linear type, dynamitron type and high frequency type.

When an ultraviolet ray is used as the ionizing radiation, it is practical to radiate light including an ultraviolet ray having a wavelength of 190 to 380 nm. The ultraviolet ray source is not particularly limited, and examples thereof include high-pressure mercury lamps, low-pressure mercury lamps, metal halide lamps and carbon arc lamps.

The surface protective layer 5 thus formed may be treated to give thereto functions such as a hard coat function, an anticlouding coat function, an antifouling coat function, an antiglare coat function, an antireflection coat function, an ultraviolet shielding coat function and an infrared shielding coat function by adding various kinds of additives.

[Third Primer Layer 8]

The third primer layer 8 is a layer that is provided under the surface protective layer 5 as necessary for the purpose of, for example, improving adhesion between the surface protective layer 5 and a layer situated thereunder. The third primer layer 8 is provided, for example, between the surface protective layer 5 and the later-described transparent coloring layer 7 as shown in FIG. 3 or FIG. 4, or between the surface protective layer 5 and the later-described transparent film layer 9. The material that forms the third primer layer 8 is not particularly limited as long as it can improve adhesion between those layers, and examples thereof include resins such as acryl-based resins, polyurethane-based resins, acryl-urethane copolymer resins and polyester-based resins.

The thickness of the third primer layer 8 is not particularly limited, but it is normally about 0.5 to 2.5 μm, preferably about 1 to 2 μm. A colorant can be mixed in the third primer layer 8 to arrange the color and improve design property, or even form a pattern in relation to design. The method for forming the third primer layer 8 is not particularly limited, and examples thereof include a method in which the above-mentioned resin is applied onto the surface of a layer situated immediately under the third primer layer 8, such as the thin metal film layer 4, the transparent coloring layer 7 or the transparent film layer 9. Examples of the method for forming the third primer layer 8 also include a method in which the above-mentioned resin is applied onto a separately prepared mold release sheet, and a layer to be situated under the third primer layer 8 in the decorative sheet is further formed on the resin, followed by peeling off the mold release sheet.

[Transparent Coloring Layer 7]

The transparent coloring layer 7 is a layer that is provided on the thin metal film layer 4 as necessary for the purpose of, for example, giving glossiness in addition to the metallic tone of the thin metal film layer 4. The material that forms the transparent coloring layer 7 is not particularly limited, and examples thereof include transparent resins colored with a colorant etc. The colorant is not particularly limited, and examples thereof include coloring pigments and dyes. The transparent resin is not particularly limited, and examples thereof include acryl-based resins, polyurethane-based resins, acryl-urethane copolymer resins and polyester-based resins. The thickness of the transparent coloring layer 7 is not particularly limited, but it is normally about 0.5 to 4 µm, preferably about 1 to 3 µm. The method for forming the transparent coloring layer 7 is not particularly limited, and examples thereof include a method in which the above-mentioned resin is applied onto the surface of a layer situated immediately under the transparent coloring layer 7, such as the later-described second primer layer 6, the later-described transparent film layer 9 or the thin metal film layer 4, or onto the surface of a layer situated immediately above the transparent coloring layer, such as the third primer layer 8.

[Second Primer Layer 6]

The second primer layer 6 is a layer that is provided as necessary for the purpose of, for example, improving adhesion between the thin metal film layer and a layer laminated thereon. As shown in, for example, FIG. 3 or FIG. 5, the second primer layer 6 can be provided immediately above the thin metal film layer 4 as necessary for the purpose of, for example, improving adhesion between the thin metal film layer 4 and a layer provided thereon. As shown in, for example, FIG. 3 or FIG. 4, the second primer layer 6 can also be provided under the transparent coloring layer 7 as necessary for the purpose of, for example, improving adhesion between the transparent coloring layer 7 and a layer situated thereunder. The second primer layer 6 is provided, for example, between the thin metal film layer 4 and the surface protective layer 5 as shown in FIG. 2, between the thin metal film layer 4 and the transparent coloring layer 7 as shown in FIG. 3, between the transparent coloring layer 7 and the later-described transparent film layer 9 as shown in FIG. 4, or between the thin metal film layer 4 and the transparent film layer 9 as shown in FIG. 5. When the second primer layer 6 is provided between the thin metal film layer 4 and the surface protective layer 5 as shown in FIG. 2, the second primer layer 6 plays the role described above in the section of the third primer 8. The material that forms the second primer layer 6 is not particularly limited as long as it can improve adhesion between those layers, and examples thereof include resins such as acryl-based resins, polyurethane-based resins, acryl-urethane copolymer resins and polyester-based resins.

When the second primer layer 6 is provided immediately above the thin metal film layer 4 in the present invention, it is preferable that the second primer layer 6 contains a cured product of a resin having a glass transition point (Tg) of 55° C. to 110° C. Accordingly, the moldability of the decorative sheet of the present invention can be further improved, and discoloration due to heat-molding can be effectively suppressed. That is, in the decorative sheet of the present invention, the second primer layer 6 provided on the thin metal film layer 4 contains a cured product of a resin having a specific glass transition point as described above, and thus the decorative sheet has excellent moldability, and is hardly dislocated at the interface between the thin metal film layer 4 and the second primer layer 6, so that a relative positional relation is hardly changed, and therefore discoloration due to heat-molding is effectively suppressed. When the glass transition point (Tg) is less than 55° C., high moldability are maintained, but discoloration easily occurs due to heat-molding. When the glass transition point (Tg) is more than 110° C., discoloration due to heat-molding can be suppressed, but moldability are easily deteriorated, so that whitening etc. due to molding easily occurs. In the present invention, the glass transition point (Tg) of the second primer layer 6 is a value obtained by differential scanning calorimetry (DSC) based on JIS K7121-1987.

The content of resins having a glass transition point (Tg) of 55° C. to 110° C. among resins that are cured to form the second primer layer 6 is preferably 50% by mass or more, more preferably 70% by mass or more, further preferably 90% by mass or more. Especially preferably, the resins that are cured to form the second primer layer 6 include only resins having a glass transition point (Tg) of 55° C. to 110° C.

Examples of the resin having a glass transition point (Tg) of 55° C. to 110° C. is not particularly limited as long as it can be cured by drying, chemical reaction or the like to form a coating film, and examples thereof include thermosetting resins and thermoplastic resins, preferably polyester-based resins, polyurethane-based resins, polyacryl-based resins and polyolefin-based resins. Among them, polyester-based resins and polyacryl-based resins are more preferable for giving high moldability to the decorative sheet and suppressing discoloration during heat-molding. The resins having a glass transition point (Tg) of 55° C. to 110° C. may be used alone, or may be used in combination of two or more thereof.

The above-mentioned polyester-based resin, polyurethane-based resin, polyacryl-based resin and polyolefin-based resin are not particularly limited, but for improving the three-dimensional moldability of the decorative sheet, for example, the polyether-based resin is a polyester polyol; the polyurethane-based resin is a urethane polyol such as a polyester urethane polyol or an acryl urethane polyol; the polyacryl-based resin is an acryl polyol; and the polyolefin-based resin is a polyolefin polyol such as a polyethylene polyol, a polypropylene polyol, a polybutadiene polyol or a polyisoprene polyol.

Examples of the polyester polyol include those shown above as an example.

The acryl polyol is not particularly limited as long as it is an acryl-based resin having a plurality of hydroxyl groups, and examples thereof include copolymers obtained by copolymerizing one or more of (meth)acrylic acid alkyl ester monomers such as methyl (meth)acrylate, ethyl (meth)acrylate, n-propyl (meth)acrylate, isopropyl (meth)acrylate, n-butyl (meth)acrylate, isobutyl (meth)acrylate, octyl (meth)acrylate and ethylhexyl (meth)acrylate, etc., and one or more of (meth)acrylic acid ester monomers having hydroxyl group in the molecule, such as 2-hydroxyethyl (meth)acrylate, 2-hydroxypropyl (meth)acrylate and 2-hydroxy-3-phenoxypropyl (meth)acrylate, and further a styrene monomer etc. as necessary, the copolymers each having a plurality of hydroxyl groups.

Preferably, the second primer layer 6 in the present invention is formed of a cured product of a curing agent and the resin having a glass transition point (Tg) of 55° C. to 110° C. More preferably, the second primer layer 6 in the present invention is formed of a reaction-curable urethane resin that is obtained from a polyol resin having a glass transition point (Tg) of 55° C. to 110° C., and a curing agent composed of an isocyanate compound or the like. The polyol resin having a glass transition point (Tg) of 55° C. to 110° C. is not particularly limited, and examples thereof include the above-mentioned polyols such as the polyester-based resins, polyurethane-based resins, polyacryl-based resins and polyolefin-based resins shown above as an example. Among the polyol resins having a glass transition point (Tg) of 55° C. to 110° C., polyester polyols or acryl polyols are especially preferable for improving the moldability of the decorative sheet and effectively suppressing discoloration due to heat-molding.

Examples of the isocyanate compound include those shown above as an example.

When the curing agent is to be used in the second primer layer 6, the content of the curing agent is not particularly limited, but for improving the moldability of the decorative sheet, and effectively suppressing discoloration due to heat-molding, the content of the curing agent is preferably about 1 to 15 parts by mass, more preferably about 3 to 10 parts by mass based on 100 parts by mass of the resin that is cured to form the second primer layer 6.

The reaction-curable urethane resin that forms the second primer layer 6 may be either a one-liquid curable type or a two-liquid curable type, and is preferably a two-liquid curable type.

The thickness of the second primer layer 6 is not particularly limited, but it is normally about 0.5 to 2.5 µm, preferably about 1 to 2 µm. A colorant can be mixed in the second primer layer 6 to arrange the color and improve design property, or even form a pattern in relation to design. The method for forming the second primer layer 6 is not particularly limited, and examples thereof include a method in which the above-mentioned resin is applied onto the surface of the transparent coloring layer 7, or the surface of a layer neighboring the second primer layer 6, such as the later-described transparent film layer 9 or the thin metal film layer 4.

[Transparent Film Layer 9]

The transparent film layer 9 is a resin film which serves as a support that improves the scratch resistance and weather resistance of the decorative sheet of the present invention, and improves moldability of the decorative sheet, and which is provided on the thin metal film layer 4 as necessary. When the transparent film layer 9 is provided, moldability are improved, so that cracks are hardly generated in the thin metal film layer 4 in three-dimensional molding of the decorative sheet, and therefore when the thin metal film layer 4 is formed using a metal (e.g. aluminum etc.) other than tin, indium and chromium which have high spreadability, it is preferable that the transparent film layer 9 is provided. The resin film that forms the transparent film layer 9 is not particularly limited as long as it improves the moldability of the decorative sheet, and does not shield a metallic-tone design of the thin metal film layer 4, and examples thereof include films of polyester resins such as polyethylene terephthalate (PET) and polyethylene naphthalate (PEN), and acryl resins. The thickness of the transparent film layer 9 is not particularly limited, but it is normally about 15 to 200 µm, preferably about 30 to 150 µm. The method for forming the transparent film layer 9 is not particularly limited, and examples thereof include a method in which the above-mentioned resin film is laminated onto the surface of a layer neighboring the transparent film layer 9, such as the thin metal film layer 4, the surface protective layer 5, the second primer layer 6, the transparent coloring layer 7 and the third primer layer 8.

[Second Adhesive Layer 10]

The second adhesive layer 10 is a layer that is provided on the back surface of the base material layer 1 as necessary for the purpose of, for example, improving bondability and adhesion between the decorative sheet and a molded resin. The resin that forms the second adhesive layer 10 is not particularly limited as long as it can improve bondability and adhesion between the decorative sheet and a molded resin, and examples thereof include thermoplastic resins and thermosetting resins. Examples of the thermoplastic resin include acryl resins, acryl-modified polyolefin resins, chlorinated polyolefin resins, vinyl chloride-vinyl acetate copolymers, thermoplastic urethane resins, thermoplastic polyester resins, polyamide resins and rubber-based resins. The thermoplastic resins may be used alone, or may be used in combination of two or more thereof. Examples of the thermosetting resin include urethane resins and epoxy resins. The thermosetting resins may be used alone, or may be used in combination of two or more thereof.

The second adhesive layer 10 is not a layer that is necessarily needed, but it is preferable to provide the second adhesive layer 10 when it is conceivable that the decorative sheet of the present invention is applied to a decoration method in which the decorative sheet is bonded onto a previously provided resin molded body, such as a vacuum press-bonding method as described later. When the decorative sheet is used in a vacuum press-bonding method, it is preferable to form the adhesive layer 8 using, among various resins described above, one that is commonly used as a resin which exhibits bondability under pressure or heating.

The thickness of the second adhesive layer 10 is not particularly limited, but it is, for example, about 0.1 to 30 µm, preferably about 0.5 to 20 µm, further preferably about 1 to 8 µm.

2. Decorative Resin Molded Article

The decorative resin molded article of the present invention is formed by integrating a molded resin with the decorative sheet of the present invention. That is, the decorative resin molded article of the present invention includes a laminated body with at least a molded resin layer, the base material layer 1, the primer layer 3 and the thin metal film layer 4 laminated in this order, wherein the primer layer 3 contains a cured product of a resin having a glass transition point of −30° C. to 80° C. In the decorative resin molded article of the present invention, the decorative sheet may be provided with at least one of the above-mentioned surface protective layer 5, second primer layer 6, transparent coloring layer 7, third primer layer 8, transparent film layer 9, second adhesive layer 10 and so on.

As described above, in the present invention, when the first primer layer 3 contains a silane coupling agent, the adhesive layer 2 formed of a resin and the thin metal film layer 4 formed of a metal can be bonded to each other with high adhesion by the first primer layer 3 while fading of the thin metal film layer 4 is suppressed. In the present invention, when the second primer layer 6 is provided immediately above the thin metal film layer 4, and the second primer layer 6 contains a cured product of a resin having a glass transition point (Tg) of 55° C. to 110° C., the moldability of the decorative sheet can be further improved, and discoloration due to heat-molding can be effectively suppressed.

The decorative resin molded article of the present invention is prepared by various injection molding methods such as, for example, an insert molding method, an injection molding simultaneous decorating method, a blow molding method and a gas injection molding method using the decorative sheet of the present invention. Among these injection molding methods, an insert molding method and an injection molding simultaneous decorating method are preferable. The decorative resin molded article of the present invention can also be prepared by a decoration method in which the decorative sheet of the present invention is bonded onto a previously provided three-dimensional resin molded body (molded resin layer), such as a vacuum press-bonding method.

In the insert molding method, first the decorative sheet of the present invention is vacuum-molded into a molded article surface shape beforehand using a vacuum molding die (off-line preliminary molding) in a vacuum molding step, and then an unnecessary portion is trimmed off as necessary to obtain a molded sheet. The molded sheet is inserted into an injection molding die, the injection molding die is closed, a fluidized resin is injected into the die, and solidified to integrate the decorative sheet with the outer surface of the resin molded body in parallel to injection molding, thereby producing a decorative resin molded article.

More specifically, the decorative resin molded article of the present invention is produced by an insert molding method including the following steps:

a vacuum molding step of molding the decorative sheet of the present invention into a three-dimensional shape beforehand by a vacuum molding die;

a trimming step of trimming off an unnecessary portion of the vacuum-molded decorative sheet to obtain a molded sheet; and an integration step of inserting the molded sheet into an injection molding die, closing the injection molding die, and injecting a fluidized resin into the injection molding die to integrate the resin with the molded sheet.

As described above, the decorative sheet of the present invention has high three-dimensional moldability. Accordingly, for example, when the decorative resin molded article has a curved portion, the decorative sheet situated at the curved portion may be stretched to a maximum draw ratio of 150% or more, or even about 200% in at least one of the vacuum molding step and the integration step described above. The upper limit value of the maximum draw ratio is preferably about 250%.

In the vacuum molding step in the insert molding method, the decorative sheet may be heated and molded. The heating temperature here is not particularly limited, and may be appropriately selected according to a type of the resin that forms the decorative sheet, or a thickness of the decorative sheet, but for example, when an ABS resin film is used as the base material layer, the heating temperature may be normally about 100 to 250° C., preferably about 130 to 200° C. In the integration step, the temperature of the fluidized resin is not particularly limited, but it may be normally about 180 to 320° C., preferably 220 to 280° C.

In the injection molding simultaneous decorating method, the decorative sheet of the present invention is disposed in a female die also serving as a vacuum molding die provided with a suction hole for injection molding, and is subjected to preliminary molding in this female die (in-line preliminary molding), the injection molding die is then closed, a fluidized resin is injected and filled into the die, and solidified to integrate the decorative sheet of the present invention with the outer surface of the resin molded body in parallel to injection molding, thereby producing a decorative resin molded article.

More specifically, the decorative resin molded article of the present invention is produced by an injection molding simultaneous decorating method including the following steps:

a preliminary molding step of placing the decorative sheet of the present invention in such a manner that the surface of the base material layer of the decorative sheet faces a molding surface of a movable die, the molding surface having a predetermined shape, then heating and softening the decorative sheet, and vacuum-suctioning the decorative sheet from the movable die side to adhere the softened decorative sheet along the molding surface of the movable die, thereby preliminarily molding the decorative sheet;

an integration step of closing the movable die having the decorative sheet adhered along the molding surface, and a fixed die, then injecting and filling a fluidized resin into a cavity formed by both the dies, solidifying the resin to form a resin molded body, and laminating and integrating the resin molded body and the decorative sheet with each other; and a taking-out step of separating the movable die from the fixed die to take out the resin molded body with all the layers of the decorative sheet laminated thereon.

When the decorative resin molded article of the present invention has a curved portion, the decorative sheet situated at the curved portion may be stretched to a maximum draw ratio of 150% or more, or even about 200% in at least one of the preliminary molding step and the integration step in the injection molding simultaneous decorating method similarly to the above-mentioned insert molding method. The upper limit value of the maximum draw ratio is preferably about 250%.

In the preliminary molding step in the injection molding simultaneous decorating method, the heating temperature of the decorative sheet is not particularly limited, and may be appropriately selected according to a type of the resin that forms the decorative sheet, or a thickness of the decorative sheet, but when a polyester resin film or an acryl resin film is used as the base material layer, the heating temperature may be normally about 70 to 130° C. In the injection molding step, the temperature of the fluidized resin is not particularly limited, but it may be normally about 180 to 320° C., preferably 220 to 280° C.

In the vacuum press-bonding method, first the decorative sheet of the present invention and a resin molded body are placed in a vacuum press-bonding machine including a first vacuum chamber situated on the upper side and a second vacuum chamber situated on the lower side in such a manner that the decorative sheet is on the first vacuum chamber side and the resin molded body is on the second vacuum chamber side, and that the base material layer 1 side of the decorative sheet faces the resin molded body side. The two vacuum chambers are then evacuated. The resin molded body is placed on a lift table that is provided on the second vacuum chamber side and is capable of moving up and down. Then, the first vacuum chamber is pressurized, and the molded body is abutted against the decorative sheet with the lift table, and by using a pressure difference between the two vacuum chambers, the decorative sheet is bonded to the surface of the resin molded body while being stretched. Finally, the two vacuum chambers are released to atmospheric pressure, and an unnecessary portion of the decorative sheet is trimmed off, so that the decorative resin molded article of the present invention can be obtained.

Preferably, the vacuum press-bonding method includes a step of heating the decorative sheet for softening the decorative sheet to improve the moldability thereof before the step of abutting the molded body against the decorative sheet. The vacuum press-bonding method including such a step may be referred to particularly as a vacuum heating and press-bonding method. The heating temperature in such a step may be appropriately selected according to a type of the resin that forms the decorative sheet, or a thickness of the decorative sheet, but when a polyester resin film or an acryl resin film is used as the base material layer, the heating temperature may be normally about 60 to 200° C.

When the decorative resin molded article of the present invention has a curved portion, the decorative sheet situated at the curved portion may be stretched to a maximum draw ratio of 150% or more, or even about 200% in the vacuum press-bonding method similarly to the above-mentioned insert molding method and injection molding simultaneous decorating method. The upper limit value of the maximum draw ratio is preferably about 250%.

In the decorative resin molded article of the present invention, a resin appropriate to a use may be selected to form the molded resin layer. The resin that forms the molded resin layer may be either a thermoplastic resin or a thermosetting resin.

Specific examples of the thermoplastic resin include polyolefin-based resins such as polyethylene and polypropylene, ABS resins, styrene resins, polycarbonate resins, acryl resins and vinyl chloride-based resins. These thermoplastic resins may be used alone, or may be used in combination of two or more thereof.

Examples of the thermosetting resin include urethane resins and epoxy resins. These thermosetting resins may be used alone, or may be used in combination of two or more thereof.

The decorative resin molded article of the present invention has improved adhesion between layers, can be molded into a complicated shape, and has a metallic tone having a high feel of material and presenting an image of high quality. Therefore, the decorative resin molded article of the present invention can be used for, for example, interior materials or exterior materials of vehicles such as automobiles; fittings such as window frames and door frames; interior materials of buildings such as walls, floors and ceilings; housings of household electric appliances such as television receivers and air conditioners; and containers etc.

EXAMPLES

Hereinafter, the present invention will be described in detail by way of examples and comparative examples. However, the present invention is not limited to examples.

Examples 1A to 10A and Comparative Examples 1A to 3A

Preparation of Decorative Sheet A

A transparent third primer layer having a thickness of 2 μm was formed on a biaxially stretched polyethylene terephthalate sheet (E5001 manufactured by TOYOBO CO., LTD., thickness: 25 μm) as a release sheet by applying an acryl-urethane block copolymer resin. Next, a transparent coloring layer (thickness: 2 μm) and a second primer layer (thickness: 2 μm) were formed in order on the third primer layer by applying an acryl-urethane block copolymer resin containing a colorant. Next, a thin metal film layer having an optical density (OD) of 1.2 was formed on the surface of the second primer layer by depositing tin. Next, a first primer layer (thickness: 2 μm) having a composition and a glass transition point (Tg) as described in Table 1A was formed on the thin metal film layer. In Examples 9A and 10A, 30 parts by mass of a colorant (including titanium oxide and carbon black) having a color similar to that of the thin metal film layer was blended with respect to 70 parts by mass of the resin of the first primer layer. Next, an adhesive layer was formed on the first primer layer by applying a resin as described in Table 1A in such a manner that the adhesive layer had a thickness of 2 μm. Next, a sheet having a thickness of 400 μm and formed of an ABS resin was brought into contact with the adhesive layer to form a base material layer on the adhesive layer, thereby obtaining a laminated body with a release sheet, a third primer layer, a transparent coloring layer, a second primer layer, a thin metal film layer, a first primer layer, an adhesive layer and a base material layer laminated in this order. Next, a stainless metal plate having an arithmetic mean roughness Ra of 4.0 μm and a ten-point mean roughness Rz JIS of 16 μm and provided with a satin pattern was disposed on the base material layer side of the laminated body, a stainless mirror plate having an arithmetic mean roughness Ra of 0.05 μm was disposed on the release layer side, and the laminated body was subjected to hot press molding with the metal plate and the mirror plate. For conditions for hot press molding, the temperature was 150° C., the pressure was 0.5 MPa, and the heating/pressurization time was 10 minutes. Next, the release sheet was peeled from the laminated body, and an uncured resin layer was formed on the surface of the first primer layer by applying an onizing radiation curable resin by gravure reverse coating in such a manner that the resin layer had a thickness of 10 μm after curing. The uncured resin layer was irradiated with an electron beam having an accelerating voltage of 165 kV and an amount of radiation of 50 kGy (5 Mrad), so that the uncured resin layer was cured to form a surface protective layer. In this way, a decorative sheet was obtained which had a configuration as shown in Table 1A and in which a base material layer, an adhesive layer, a first primer layer, a thin metal film layer, a second primer layer, a transparent coloring layer, a third primer layer and a surface protective layer were laminated in this order. As the onizing radiation curable resin, a mixture of 80 parts by mass of a difunctional polycarbonate acrylate (weight average molecular weight: 10000) and 20 parts by mass of a hexafunctional urethane acrylate oligomer (weight average molecular weight: 6000) was used. In Comparative Example 3A, the first primer layer was not provided.

(Test for Evaluation of Moldability)

The decorative sheet of each of Examples 1A to 10A and Comparative Examples 1A to 3A was heated to 160° C. with an infrared heater, and thereby softened. Next, the decorative sheet was vacuum-molded using a vacuum molding die under conditions ensuring a maximum draw ratio of 150%, so that the decorative sheet was molded so as to follow the internal shape of the vacuum molding die. Next, the decorative sheet was cooled, and then released from the vacuum molding die. Samples were rated as having good moldability ("Good") where the surface protective layer of the released decorative sheet was not cracked or whitened at all, and the decorative sheet satisfactorily followed the internal shape of the vacuum molding die. Samples were rated as having poor moldability ("Bad") where the surface protective layer of the released decorative sheet was cracked or whitened, and the decorative sheet could not follow the internal shape of the vacuum molding die. The results are shown in Table 1A.

(Test for Evaluation of Adhesion)

The decorative sheet of each of Examples 1A to 10A and Comparative Examples 1A to 3A was vacuum-molded by the same method as in the test for evaluation of moldability. Next, the surface of the surface protective layer of the released decorative sheet was notched in a checkerboard pattern so as to draw 10 lines in the longitudinal direction and 10 lines in a lateral direction at intervals of 2 mm using a cutter knife. Next, Cellotape (registered trademark) manufactured by Nichiban Co., Ltd. was press-bonded to notched portions, and rapidly peeled off in the direction of 90°. As a result of the test for evaluation of adhesion, samples were rated as having good adhesion ("Good") where the decorative sheet was not delaminated at all. Samples were rated as having proper adhesion ("Fair") where the decorative sheet was very slightly notched along the notches, but there was no problem in practical use. Samples were rated as having poor adhesion ("Bad") where the decorative sheet was apparently delaminated. The results are shown in Table 1A.

(Test for Evaluation of Fading Resistance)

The decorative sheet of each of Examples 1A to 10A and Comparative Examples 1A to 3A was vacuum-molded by the same method as in the test for evaluation of moldability, and then left standing under an environment at a temperature of 60° C. and a humidity of 90% for 72 hours. Next, a color difference ΔE*ab (conforming to the L*a*b color system of International Commission on Illumination (CIE) as defined in JIS Z8729-1994) was measured using a spectrophotometer (CM-3700d manufactured by KONICA MINOLTA, INC.). The color difference ΔE*ab was expressed by the following formula.

$$\Delta E^*ab = \sqrt{(\Delta L^*)^2 + (\Delta a^*)^2 + (\Delta b^*)^2}$$

As a reference for the color difference, the decorative sheet of each of Examples 1A to 10A and Comparative Examples 1A to 3A before being subjected to the test for evaluation of fading resistance was used. As a result of the test for evaluation of fading resistance, samples having a color difference ΔE*ab of less than 3 were rated as having a low level of fading ("Good"), samples having a color difference ΔE*ab of not less than 3 and less than 5 were rated as having a slightly high level of fading ("Fair"), and samples having a color difference ΔE*ab of more than 5 were rated as having a high level of fading ("Bad"). The results are shown in Table 1A.

(Test for Evaluation of Heat Resistance of Decorative Resin Molded Article)

Figure 6:
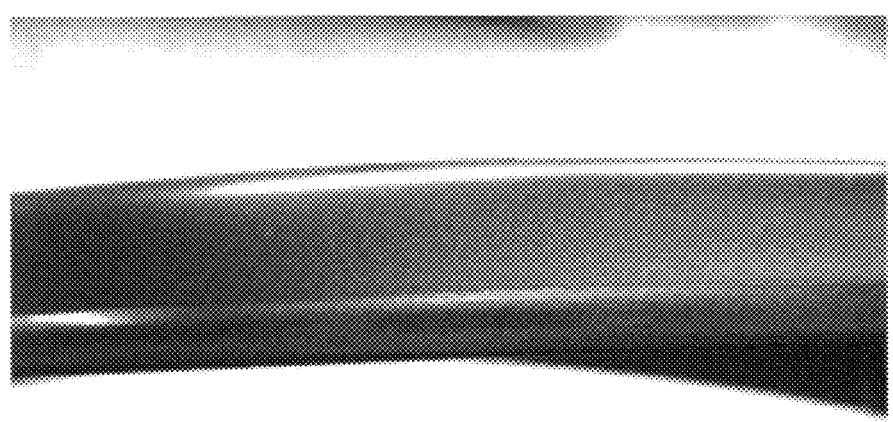
FIG. 6 is a photograph of a surface of a decorative resin molded article after a heat-resistance test, the decorative resin molded article produced using a decorative sheet obtained in Example 1A.
Figure 7:
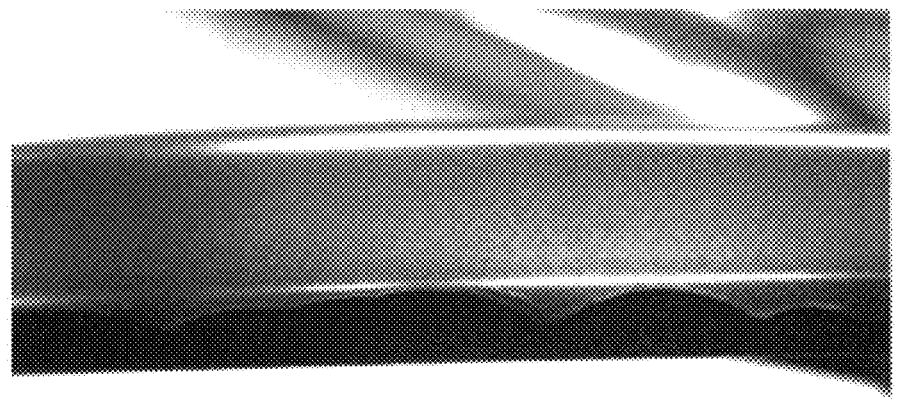
FIG. 7 is a photograph of a surface of a decorative resin molded article after a heat-resistance test, the decorative resin molded article produced using a decorative sheet obtained in Comparative Example 1A.

The decorative sheet of each of Examples 1A to 10A and Comparative Examples 1A to 3A was vacuum-molded by the same method as in the test for evaluation of moldability, and used for injection molding. An ABS resin [manufactured by NIPPON A&L INC., trade name "KRALASTIC MTH-2"] was provided as an injection resin, brought into a molten state at 230° C., and injected into a cavity. At the time when the die temperature reached 30° C., a decorative resin molded article was taken out from the die to obtain a decorative resin molded article with the decorative sheet of each of Examples 1A to 10A and Comparative Examples 1A to 3A integrated with the injection resin. Next, the obtained decorative resin molded article was left standing under an environment at a temperature of 100° C. and a humidity of 65% for 168 hours, and the surface of the decorative resin molded article was then visually observed to check whether or not the decorative sheet was delaminated. Samples were rated "Good" where the decorative sheet was not delaminated at all, samples were rated "Good/Fair" where the decorative sheet was very slightly delaminated, but there was utterly no problem in practical use, samples were rated "Fair" where the decorative sheet was slightly delaminated, but there was no problem in practical use, and samples were rated "Bad" where the decorative sheet was delaminated, and there was a problem in practical use. The results are shown in Table 1A. Photographs of the surfaces of decorative resin molded articles obtained using the decorative sheets of Examples 1A and Comparative Examples 1A after the test for evaluation of heat resistance are shown in FIGS. 6 and 7, respectively.

TABLE 1A

| Configuration of decorative sheet | | | Example 1A | Example 2A | Example 3A | Example 4A | Example 5A | Example 6A | Example 7A |
|---|---|---|---|---|---|---|---|---|---|
| Surface protective layer | | | Onizing radiation curable resin | | | | | | |
| Third primer layer | | | Acryl-urethane copolymer | | | | | | |
| Transparent coloring layer | | | Acryl-urethane copolymer | | | | | | |
| Second primer layer | | | Acryl-urethane copolymer | | | | | | |
| Thin metal film layer | | | Sn | | | | | | |
| First primer layer | Resin | Type | Polyester polyol | | | | | | |
| | | Tg (° C.) | 10 | 10 | −20 | 0 | 20 | 50 | 70 |
| | Curing agent | | HDI | XDI | | | HDI | | |
| | Resin/curing agent (mass ratio) | | | | 100/5 | | | | |
| | Colorant | | — | — | — | — | — | — | — |
| Adhesive layer | Resin (mass ratio) | | Mixed resin of acryl resin and vinyl chloride-vinyl acetate copolymer (40:60) | | | | | | |
| Base material layer | | | ABS resin | | | | | | |
| Evaluation of moldability | | | Good | Good | Good | Good | Good | Good | Good |
| Evaluation of adhesion | | | Good | Good | Fair | Good | Good | Good | Good |
| Evaluation of fading resistance | | | Good | Good | Fair | Good | Good | Good | Good |
| Evaluation of heat resistance | | | Good | Good/Fair | Good | Good | Good | Fair | Fair |

| Configuration of decorative sheet | Example 8A | Example 9A | Example 10A | Comparative Example 1A | Comparative Example 2A | Comparative Example 3A |
|---|---|---|---|---|---|---|
| Surface protective layer | Onizing radiation curable resin | | | | | |
| Third primer layer | Acryl-urethane copolymer | | | | | |
| Transparent coloring layer | Acryl-urethane copolymer | | | | | |
| Second primer layer | Acryl-urethane copolymer | | | | | |
| Thin metal film layer | Sn | | | | | |

TABLE 1A-continued

| First primer layer | Resin | Type | Acryl polyol | Polyester polyol | Acryl polyol | Polyester polyol | | — |
|---|---|---|---|---|---|---|---|---|
| | | Tg (° C.) | 50 | −20 | 50 | 100 | −40 | |
| | Curing agent | | | | HDI | | | |
| | Resin/curing agent (mass ratio) | | | | 100/5 | | | |
| | Colorant | | — | Used | Used | — | — | — |
| Adhesive layer | Resin (mass ratio) | | Mixed resin of acryl resin and vinyl chloride-vinyl acetate copolymer (40:60) | | | | | |
| Base material layer | | | ABS resin | | | | | |
| Evaluation of moldability | | | Good | Good | Good | Bad | Good | Good |
| Evaluation of adhesion | | | Good | Fair | Good | Good | Bad | Good |
| Evaluation of fading resistance | | | Fair | Good | Good | Good | Bad | Bad |
| Evaluation of heat resistance | | | Fair | Good | Fair | Bad | Good | Bad |

In Table 1A, "HDI" denotes 1,6-hexamethylene diisocyanate, and "XDI" denotes xylene-1,3-diisocyanate.

As shown in Table 1A, it has become apparent that in each of the decorative sheets of Examples 1A to 10A where the first primer layer containing a cured product of a resin having a glass transition point (Tg) of −30° C. to 80° C. was provided between the adhesive layer and the thin metal film layer, the decorative sheet had excellent moldability and adhesion, and fading of the thin metal film layer was suppressed. In the decorative sheets of Examples 9A and 10A, a colorant having a color similar to that of the thin metal film layer was blended in the first primer layers of Examples 3A and 9A, respectively, and the decorative sheets of Examples 9A and 10A had superior fading resistance. Further, the decorative sheet of each of Examples 1A to 10A was not delaminated at all, or delaminated within the bounds of not causing a problem in practical use even when the decorative sheet was heated after being formed into a decorative resin molded article. For example, as shown in the photograph in FIG. 6, the decorative resin molded article obtained from the decorative sheet of Example 1A was not delaminated at all after the heat resistance test was conducted. On the other hand, in Comparative Example 1A where the first primer layer was provided, but a resin having a glass transition point (Tg) of more than 80° C. was used, the decorative sheet had poor moldability, and was delaminated to the extent of causing a problem in practical use when the decorative resin molded article was heated. For example, as shown in the photograph in FIG. 7, the decorative resin molded article obtained from the decorative sheet of Comparative Example 1A was delaminated (a part where the surface of the decorative sheet turned over like a mountain), so that the base material layer of the decorative sheet was exposed to the surface of the decorative resin molded article, after the heat resistance test was conducted, and thus there was a problem in practical use. In Comparative Example 2A where the first primer layer was provided, but a resin having a glass transition point (Tg) of less than −30° C. was used, the decorative sheet had poor adhesion and fading resistance. Further, in Comparative Example 3A where the first primer layer was not provided, the thin metal film layer was significantly faded, and the decorative sheet was delaminated to the extent of causing a problem in a practical use after the decorative resin molded article was heated.

Examples 1B to 8B and 11B and Comparative Examples 1B to 4B

Preparation of Decorative Sheet B

A transparent third primer layer having a thickness of 2 μm was formed on a biaxially stretched polyethylene terephthalate sheet (A5101 manufactured by TOYOBO CO., LTD., thickness: 25 μm) as a release sheet by applying an acryl-urethane block copolymer resin. Next, a transparent coloring layer (thickness: 3 μm) and a second primer layer (thickness: 2 μm) were formed in order on the third primer layer by applying an acryl-urethane block copolymer resin containing a colorant and a transparent acryl-urethane block copolymer resin in order. Next, a thin metal film layer having an optical density (OD) of 1.2 was formed on the surface of the second primer layer by depositing a metal as described in Table 1B. Next, a first primer layer (thickness: 2 μm) having a composition as described in Table 1B was formed on the thin metal film layer. In Example 11B, 30 parts by mass of a colorant (including titanium oxide and carbon black) having a color similar to that of the thin metal film layer was blended with respect to 70 parts by mass of the resin of the first primer layer. Next, an adhesive layer was formed on the first primer layer by applying an application amount of resin as described in Table 1B. Next, a sheet having a thickness of 400 μm and formed of an ABS resin was brought into contact with the adhesive layer to form a base material layer on the adhesive layer, thereby obtaining a laminated body with a release sheet, a third primer layer, a transparent coloring layer, a second primer layer, a thin metal film layer, a first primer layer, an adhesive layer and a base material layer laminated in this order. Next, a stainless metal plate having an arithmetic mean roughness Ra of 4.0 μm and a ten-point mean roughness Rz JIS of 16 μm and provided with a satin pattern was disposed on the base material layer side of the laminated body, a stainless mirror plate having an arithmetic mean roughness Ra of 0.05 μm was disposed on the release layer side, and the laminated body was subjected to hot press molding with the metal plate and the mirror plate. For conditions for hot press molding, the temperature was 150° C., the pressure was 0.5 MPa, and the heating/pressurization time was 10 minutes. Next, the release sheet was peeled from the laminated body, and an uncured resin layer was formed on the surface of the third primer layer by applying an onizing radiation curable resin by gravure reverse coating in such a manner that the resin layer had a thickness of 10 μm after curing. The uncured resin layer was irradiated with an electron beam having an accelerating voltage of 165 kV and an amount of radiation of 50 kGy (5 Mrad), so that the uncured resin layer was cured to form a surface protective layer. In this way, a decorative sheet was obtained which had a configuration as shown in Table 1B and in which a base material layer, an adhesive layer, a first primer layer, a thin metal film layer, a second primer layer, a transparent coloring layer, a third primer layer and a surface protective layer were laminated in this order. As the onizing radiation curable resin, a mixture of 80 parts by mass of a difunctional polycarbonate acrylate (weight average molecular weight: 10000) and 20 parts by mass of a hexafunctional urethane acrylate oligomer (weight average molecular weight: 6000) was used. In Comparative Example 1B, a silane coupling agent was not blended in the first primer layer. In Comparative Examples 2B and 3B, the first primer layer was not provided. In Comparative Example 4B, the adhesive layer was not provided.

Examples 9B and 10B

A thin metal film layer having an optical density (OD) of 1.2 was formed on one surface of a biaxially stretched polyethylene terephthalate film (thickness: 38 μm) as a transparent film layer by depositing a metal as described in Table 1B. Next, a first primer layer (thickness: 2 μm) having a composition as described in Table 1B, and an adhesive layer of an application amount of resin as described in Table 1B were formed in order on the thin metal film layer by application. Next, on a surface of the transparent film layer which was not provided with the thin metal film layer, an acryl-urethane block copolymer resin was sequentially applied to form a transparent second primer layer (thickness: 2 μm), transparent coloring layer (thickness: 3 μm) and a transparent primer layer (thickness: 2 μm). Next, an uncured resin layer was formed on the third primer layer by applying an onizing radiation curable resin by gravure reverse coating in such a manner that the resin layer had a thickness of 10 μm after curing. The uncured resin layer was irradiated with an electron beam having an accelerating voltage of 165 kV and an amount of radiation of 50 kGy (5 Mrad), so that the uncured resin layer was cured to form a surface protective layer. A base material layer was formed on the adhesive layer by laminating a sheet having a thickness of 400 μm and composed of an ABS resin, so that a decorative sheet was obtained which had a configuration as shown in Table 1B and in which a base material layer, an adhesive layer, a first primer layer, a thin metal film layer, a transparent film layer, a second primer layer, a transparent coloring layer, a third primer layer and a surface protective layer were laminated in this order. As the onizing radiation curable resin, the same mixture as in Examples 1B to 8B and 11B and Comparative Examples 1B to 4B was used.

(Test for Evaluation of Moldability)

The decorative sheet of each of Examples 1B to 11B and Comparative Examples 1B to 4B was heated to 160° C. with an infrared heater, and thereby softened. Next, the decorative sheet was vacuum-molded using a vacuum molding die under conditions ensuring a maximum draw ratio of 150%, so that the decorative sheet was molded so as to follow the internal shape of the vacuum molding die. Next, the decorative sheet was cooled, and then released from the vacuum molding die. Samples were rated as having good moldability ("Good") where the surface protective layer of the released decorative sheet was not cracked or whitened at all, and the decorative sheet satisfactorily followed the internal shape of the vacuum molding die. As a result of the test for evaluation of moldability, samples were rated as having proper moldability (Good/Fair) where the released decorative sheet was slightly cracked or whitened at a part of the three-dimensional-molded portion or the maximum-stretched portion, but there was no problem in practical use. Samples were rated as having poor moldability ("Bad") where the surface protective layer of the released decorative sheet was cracked or whitened, and the decorative sheet could not follow the internal shape of the vacuum molding die.

(Test for Evaluation of Adhesion)

The decorative sheet of each of Examples 1B to 11B and Comparative Examples 1B to 4B was vacuum-molded by the same method as in the test for evaluation of moldability. Next, the surface of the surface protective layer of the released decorative sheet was notched in a checkerboard pattern so as to draw 10 lines in the longitudinal direction and 10 lines in a lateral direction at intervals of 2 mm using a cutter knife. Next, Cellotape (registered trademark) manufactured by Nichiban Co., Ltd. was press-bonded to notched portions, and rapidly peeled off. As a result of the test for evaluation of adhesion, samples were rated as having good adhesion ("Good") where the decorative sheet was not delaminated at all. Samples were rated as having proper adhesion ("Good/Fair") where the decorative sheet was very slightly notched along the notches, but there was no problem in practical use. Samples were rated as having poor adhesion ("Bad") where the decorative sheet was apparently delaminated.

(Test for Evaluation of Fading Resistance)

The decorative sheet of each of Examples 1B to 11B and Comparative Examples 1B to 4B was vacuum-molded by the same method as in the test for evaluation of moldability, and then left standing under an environment at a temperature of 60° C. and a humidity of 90% for 168 hours. Next, a color difference $\Delta E^*ab$ (conforming to the $L^*a^*b$ color system of International Commission on Illumination (CIE) as defined in JIS Z8729-1994) was measured using a spectrophotometer (CM-3700d manufactured by KONICA MINOLTA. INC.). The color difference $\Delta E^*ab$ was expressed by the following formula.

$$\Delta E^*ab = \sqrt{(\Delta L^*)2 + (\Delta a^*)2 + (\Delta b^*)2}$$

As a reference for the color difference, the decorative sheet of each of Examples 1B to 11B and Comparative Examples 1B to 4B before being subjected to the test for evaluation of fading resistance was used. As a result of the test for evaluation of fading resistance, samples having a color difference $\Delta E^*ab$ of 5 or less were rated as having a low level of fading ("Good"), and samples having a color difference $\Delta E^*ab$ of 5 or more were rated as having a high level of fading ("Bad").

TABLE 1B

| Configuration of decorative sheet | Example 1B | Example 2B | Example 3B | Example 4B | Example 5B | Example 6B | Example 7B | Example 8B |
|---|---|---|---|---|---|---|---|---|
| Surface protective layer | Onizing radiation curable resin | | | | | | | |
| Third primer layer | Acryl-urethane copolymer | | | | | | | |
| Transparent coloring layer | Acryl-urethane copolymer | | | | | | | |
| Second primer layer | Acryl-urethane copolymer | | | | | | | |
| Transparent film layer | — | | | | | | | |
| Thin metal film layer | Sn | | Cr | In | | | Sn | |

TABLE 1B-continued

| | | | | | | | | | |
|---|---|---|---|---|---|---|---|---|---|
| First primer layer | Resin | | Plyester polyol Tg: 0° C. | | | | Acryl polyol Tg: 70° C. | Urethane polyol Tg: 0° C. | Polyethylene polyol Tg: −30° C. |
| | Curing agent | | | | XDI | | | | |
| | Resin/curing agent (mass raio) | | | | 100/5 | | | | |
| | Silane coupling agent | | | | Mercapto-based | | | | Vinyl-based |
| | Colorant | | | | — | | | | |
| Adhesive layer | Resin (mass ratio) | | | | Mixed resin of acryl resin and vinyl chloride-vinyl acetate copolymer (40:60) | | | | |
| | Application amount of adhesive (g/m²) | 1.5 | 3.0 | 0.8 | 1.5 | | | 1.5 | |
| Base material layer | | | | ABS resin (PZ250 manufactured by Chisso Corporation) | | | | | |
| Evaluation of processability | | Good | Good | Good | Good/Fair | Good | Good | Good | Good |
| Evaluation of adhesion | | Good | Good/Fair | Good/Fair | Good | Good | Good | Good | Good |
| Evaluation of fading resistance | | Good | Good/Fair | Good | Good | Good | Good | Good | Good |

| Configuration of decorative sheet | | Example 9B | Example 10B | Example 11B | Comparative Example 1B | Comparative Example 2B | Comparative Example 3B | Comparative Example 4B |
|---|---|---|---|---|---|---|---|---|
| Surface protective layer | | | | Onizing radiation curable resin | | | | |
| Third primer layer | | | | Acryl-urethane copolymer | | | | |
| Transparent coloring layer | | | | Acryl-urethane copolymer | | | | |
| Second primer layer | | | | Acryl-urethane copolymer | | | | |
| Transparent film layer | | PET | — | | | | | |
| Thin metal film layer | | Sn | Al | Sn | | Sn | | |
| First primer layer | Resin | Polyester polyol Tg: 0° C. | Polyester polyol Tg: 0° C. | Polyethylene polyol Tg: −30° C. | — | — | | Polyethylene polyol Tg: −300° C. |
| | Curing agent | | XDI | | | | | XDI |
| | Resin/curing agent (mass raio) | | 100/5 | | | | | 100/5 |
| | Silane coupling agent | Mercapto-based | Mercapto-based | — | | | | Mercapto-based |
| | Colorant | — | Used | | | | | |
| Adhesive layer | Resin (mass ratio) | | Mixed resin of acryl resin and vinyl chloride-vinyl acetate copolymer (40:60) | | | Acryl resin | | — |
| | Application amount of adhesive (g/m²) | 1.5 | 3.0 | | 1.5 | | | |
| Base material layer | | | ABS resin (PZ250 manufactured by Chisso Corporation) | | | | | |
| Evaluation of processability | | Good | Good/Fair | Good | Good | Good | Good | Good |
| Evaluation of adhesion | | Good | Good | Good/Fair | Bad | Good | Bad | Bad |
| Evaluation of fading resistance | | Good | Good | Good | Good/Fair | Bad | Good | Good |

In Table 1B. "Tg" denotes a glass transition point. "XDI" denotes xylene diisocyanate.

As shown in Table 1B, it has become apparent that in each of the decorative sheets of Examples 1B to 11B where the first primer layer containing a silane coupling agent was provided between the adhesive layer and the thin metal film layer, the decorative sheet had excellent moldability and adhesion, and fading of the thin metal film layer was suppressed. In the decorative sheet of Example 11B, a colorant having a color similar to that of the thin metal film layer was blended in the first primer layer of Examples 2B, and the decorative sheet of Example 11B had superior fading resistance. On the other hand, in Comparative Example 1B where the first primer layer was provided, but a silane coupling agent was not blended, the decorative sheet had excellent moldability, but adhesion between the first primer layer and the thin metal film layer after molding of the decorative sheet was deteriorated. In Comparative Example 2B where the first primer layer was not provided, the thin metal film layer was significantly faded. In Comparative Example 3B where an acryl resin was used in the adhesive layer, and the first primer layer was not provided, fading of the thin metal film layer could be suppressed, but adhesion between the adhesive layer and the thin metal film layer after molding of the decorative sheet was deteriorated. Further, in Comparative Example 4B where the adhesive layer was not provided, adhesion between the first primer layer and the thin metal film layer after molding of the decorative sheet was deteriorated.

Examples 1C to 7C and Comparative Examples 1C to 3C

Preparation of Decorative Sheet C

A transparent third primer layer having a thickness of 2 μm was formed on a biaxially stretched polyethylene terephthalate sheet (E5001 manufactured by TOYOBO CO., LTD., thickness: 25 μm) as a release sheet by applying an acryl-urethane block copolymerization resin. Next, a transparent coloring layer (thickness: 2 μm) was formed on the third primer layer by applying an acryl-urethane block copolymerization resin containing about 3% by mass of a colorant. Next, a second primer layer having a composition as described in Table 1C was formed in such a manner that the second primer layer had a thickness of 2 μm. Next, a thin metal film layer having an optical density (OD) of 1.2 was formed on the surface of the second primer layer by depositing tin. Next, a first primer layer (thickness: 2 μm) was formed on the thin metal film layer by applying an acryl-urethane block copolymerization resin. Next, an adhesive layer was formed on the first primer layer by applying a vinyl chloride-vinyl acetate copolymer in such a manner that the adhesive layer had a thickness of 2 μm. Next, a sheet having a thickness of 400 μm and formed of an ABS resin was brought into contact with the adhesive layer, thereby obtaining a laminated body with a release sheet, a third primer layer, a transparent coloring layer, a second primer layer, a thin metal film layer, a first primer layer, an adhesive layer and a base material layer laminated in this order.

Next, a stainless metal plate having an arithmetic mean roughness Ra of 4.0 μm and a ten-point mean roughness Rz JIS of 16 μm and provided with a satin pattern was disposed on the base material layer side of the laminated body, a stainless mirror plate having an arithmetic mean roughness Ra of 0.05 μm was disposed on the release sheet side, and the laminated body was subjected to hot press molding with the metal plate and the mirror plate. For conditions for hot press molding, the temperature was 150° C., the pressure was 0.5 MPa, and the heating/pressurization time was 10 minutes. Next, the release layer was peeled from the laminated body, and an uncured resin layer was formed on the surface of the third primer layer by applying an onizing radiation curable resin by gravure reverse coating in such a manner that the resin layer had a thickness of 10 μm after curing. The uncured resin layer was irradiated with an electron beam having an accelerating voltage of 165 kV and an amount of radiation of 50 kGy (5 Mrad), so that the uncured resin layer was cured to form a surface protective layer. In this way, a decorative sheet was obtained which had a configuration as shown in Table 1C and in which a base material layer, an adhesive layer, a first primer layer, a thin metal film layer, a second primer layer, a transparent coloring layer, a third primer layer and a surface protective layer were laminated in this order. As the onizing radiation curable resin, a mixture of 80 parts by mass of a difunctional polycarbonate acrylate (weight average molecular weight: 10000) and 20 parts by mass of a hexafunctional urethane acrylate oligomer (weight average molecular weight: 6000) was used. In Comparative Example 3C, the second primer layer was not provided.

(Test for Evaluation of Moldability)

The decorative sheet of each of Examples 1C to 7C and Comparative Examples 1C to 3C was heated to 160° C. with an infrared heater, and thereby softened. Next, the decorative sheet was vacuum-molded using a vacuum molding die under conditions ensuring a maximum draw ratio of 150%, so that the decorative sheet was molded so as to follow the internal shape of the vacuum molding die. Next, the decorative sheet was cooled, and then released from the vacuum molding die. Samples were rated as having good moldability ("Good") where the released decorative sheet was not cracked or whitened at all, and the decorative sheet satisfactorily followed the internal shape of the vacuum molding die. Samples were rated "Good/Fair" where the released decorative sheet was very slightly cracked or whitened, but there was utterly no problem in practical use. Samples were rated "Fair" where the released decorative sheet was slightly cracked or whitened, but there was no problem in practical use. Samples were rated "Very Bad" where the released decorative sheet was cracked or whitened, the decorative sheet could not follow the internal shape of the vacuum molding die, and had poor moldability, and there was a problem in practical use. The results are shown in Table 1C.

(Discoloration Due to Heating)

The decorative sheet of each of Examples 1C to 7C and Comparative Examples 1C to 3C was vacuum-molded by the same method as in the test for evaluation of moldability. As a result of visually observing the surface of the decorative sheet after vacuum molding, samples were rated "Good" where the decorative sheet was not discolored at all, samples were rated "Good/Fair" where the decorative sheet was very slightly discolored, but there was utterly no problem in practical use, samples were rated "Fair" where the decorative sheet was slightly discolored, but there was no problem in practical use, and samples were rated "Very Bad" where the decorative sheet was discolored, and there was a problem in practical use. The results are shown in Table 1C.

TABLE 1C

| Configuration of decorative sheet | | | Example 1C | Example 2C | Example 3C | Example 4C | Example 5C | Example 6C | Example 7C | Comparative Example 1C | Comparative Example 2C | Comparative Example 3C |
|---|---|---|---|---|---|---|---|---|---|---|---|---|
| Surface protective layer | | | Onizing radiation curable resin | | | | | | | | | |
| Third primer layer | | | Acryl-urethane copolymer | | | | | | | | | |
| Transparent coloring layer | | | Acryl-urethane copolymer | | | | | | | | | |
| Second primer layer | Resin | Type | Acryl polyol | | | Polyester polyol | | | | Acryl polyol | | — |
| | | Tg (° C.) | 55 | 70 | 90 | 110 | 90 | 55 | 110 | 45 | 120 | |
| | Curing agent (mass ratio) | | XDI/HDI = 9/1 | | | | | | | | | |
| | Resin/curing agent (mass ratio) | | 100/5 | | | | | | | | | |
| Thin metal film layer | | | Sn | | | | | | | | | |
| First primer layer | | | Acryl-urethan copolymer | | | | | | | | | |
| Adhesive layer | Resin (mass ratio) | | Mixed resin of acryl resin and vinyl chloride-vinyl acetate copolymer (40:60) | | | | | | | | | |
| Base material layer | | | ABS resin | | | | | | | | | |
| Evaluation of moldability | | | Good | Good | Good | Fair | Good | Good | Good/Fair | Good | Very Bad | Good |
| Evaluation of discoloration | | | Fair | Good/Fair | Good | Good | Fair | Fair | Good | Very Bad | Good | Very Bad |

In Table 1C, "HDI" denotes 1,6-hexamethylene diisocyanate, and "XDI" denotes xylene-1,3-diisocyanate.

As shown in Table 1C, it has become apparent that in each of the decorative sheets of Examples 1C to 7C where the second primer layer containing a cured product of a resin having a glass transition point (Tg) of 55° C. to 110° C. was provided on the thin metal film layer, the decorative sheet had excellent moldability, and discoloration due to heating was effectively suppressed. On the other hand, in Comparative Example 1C where the second primer layer was provided, but a resin having a glass transition point (Tg) of less than 55° C. was used, the decorative sheet had excellent moldability, but was significantly discolored due to heating. In Comparative Example 2C where the second primer layer was provided, but a resin having a glass transition point (Tg) of more than 110° C. was used, discoloration due to heating was suppressed, but the decorative sheet had poor moldability. In Comparative Example 3 where the third primer layer was not provided, the decorative sheet had excellent moldability, but was significantly discolored due to heating.

DESCRIPTION OF REFERENCE SIGNS

1 . . . Base material layer
2 . . . Adhesive layer
3 . . . First primer layer
4 . . . Thin metal film layer
5 . . . Surface protective layer
6 . . . Second primer layer
7 . . . Transparent coloring layer
8 . . . Third primer layer
9 . . . Transparent film layer

The invention claimed is:

1. A decorative sheet comprising:
a laminated body with at least a base material layer, a first primer layer and a thin metal film layer laminated in this order,
wherein the thin metal film layer is formed of a vapor-deposited metal,
wherein the first primer layer contains a cured product of a resin having a glass transition point of −30° C. to 40° C., and
wherein the first primer layer and the thin metal film layer are in direct contact with each other,
wherein the resin having a glass transition point of −30° C. to 40° C. is a polyol resin,
wherein the first primer layer is formed of a cured product of the polyol resin and an isocyanate compound,
and wherein the resin having a glass transition point of −30° C. to 40° C. is at least one selected from the group consisting of a polyester-based resin, a polyurethane-based resin and a polyolefin-based resin, wherein the decorative sheet is used for decoration of a resin molded article having a curved portion, and the curved portion has a shape that requires the decorative sheet to be stretched at a maximum draw ratio of 150% or more.

2. The decorative sheet according to claim 1, wherein the polyol resin in the first primer layer is a polyester polyol.

3. The decorative sheet according to claim 1, wherein the isocyanate compound in the first primer layer is an aliphatic isocyanate compound.

4. The decorative sheet according to claim 1, wherein an adhesive layer is provided between the base material layer and the first primer layer.

5. The decorative sheet according to claim 4, wherein the adhesive layer contains a chlorine-based resin.

6. The decorative sheet according to claim 5, wherein the first primer layer is formed of a resin composition containing a silane coupling agent.

7. The decorative sheet according to claim 5, wherein the chlorine-based resin is at least one selected from the group consisting of polyvinyl chloride, chlorinated polyethylene, polyvinylidene chloride, an ethylene-vinyl chloride copolymer, a vinyl chloride-vinyl acetate copolymer, polypropylene chloride and chlorinated polypropylene.

8. The decorative sheet according to claim 1, wherein the first primer layer contains substantially no chlorine-based resin.

9. The decorative sheet according to claim 1, wherein the thin metal film layer is formed of at least one selected from the group consisting of tin, indium, chromium, aluminum, nickel, copper, silver, gold, platinum, zinc and an alloy containing at least one of these metals.

10. The decorative sheet according to claim 1, wherein a surface protective layer is further laminated on the thin metal film layer.

11. The decorative sheet according to claim 10, wherein a second primer layer is further provided between the thin metal film layer and the surface protective layer, and the second primer layer contains a cured product of a resin having a glass transition point of 55° C. to 110° C.

12. The decorative sheet according to claim 11, wherein the resin having a glass transition point of 55° C. to 110° C. is at least one selected from the group consisting of a polyester-based resin, a polyurethane-based resin, a polyacryl-based resin and a polyolefin-based resin.

13. The decorative sheet according to claim 11, wherein the resin having a glass transition point of 55° C. to 110° C. is a polyol resin, and the second primer layer is formed of a cured product of the polyol resin and an isocyanate compound.

14. The decorative sheet according to claim 13, wherein the polyol resin in the second primer layer is at least one of a polyester polyol and an acryl polyol.

15. The decorative sheet according to claim 13, wherein the isocyanate compound in the second primer layer is at least one of an aliphatic isocyanate compound and an aromatic isocyanate compound.

16. The decorative sheet according to claim 1, wherein a transparent film layer is further laminated on the thin metal film layer.

17. The decorative sheet according to claim 1, wherein the first primer layer further contains a colorant.

* * * * *